United States Patent
Akizuki et al.

(10) Patent No.: US 10,253,220 B2
(45) Date of Patent: Apr. 9, 2019

(54) ACRYLIC PRESSURE-SENSITIVE ADHESIVE COMPOSITION, ACRYLIC PRESSURE-SENSITIVE ADHESIVE LAYER, PRESSURE-SENSITIVE ADHESIVE LAYER-ATTACHED SUBSTRATE FILM, LAMINATE, AND IMAGE DISPLAY DEVICE

(71) Applicant: NITTO DENKO CORPORATION, Ibaraki-shi, Osaka (JP)

(72) Inventors: Shinsuke Akizuki, Ibaraki (JP); Yuusuke Toyama, Ibaraki (JP); Atsushi Yasui, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 71 days.

(21) Appl. No.: 15/109,740

(22) PCT Filed: Dec. 25, 2014

(86) PCT No.: PCT/JP2014/084416
§ 371 (c)(1),
(2) Date: Jul. 5, 2016

(87) PCT Pub. No.: WO2015/102086
PCT Pub. Date: Jul. 9, 2015

(65) Prior Publication Data
US 2016/0326402 A1    Nov. 10, 2016

(30) Foreign Application Priority Data

Jan. 6, 2014 (JP) .................................. 2014-000473
Dec. 24, 2014 (JP) .................................. 2014-260448

(51) Int. Cl.
*C09J 7/02* (2006.01)
*C09J 11/06* (2006.01)
(Continued)

(52) U.S. Cl.
CPC ................. *C09J 11/06* (2013.01); *B32B 7/12* (2013.01); *B32B 27/06* (2013.01); *B32B 27/308* (2013.01);
(Continued)

(58) Field of Classification Search
CPC . C09J 7/0217; C09J 7/385; C09J 11/06; C09J 133/06; C09J 133/04;
(Continued)

(56) References Cited

U.S. PATENT DOCUMENTS 4,217,434 A * 8/1980 Koeble .................. C09J 133/08
156/326
2009/0208741 A1 * 8/2009 Toyama ................. C08G 18/10
428/355 AC
(Continued)

FOREIGN PATENT DOCUMENTS

CN    1282360 A    1/2001
CN    102838946 A   12/2012
(Continued)

OTHER PUBLICATIONS

Teixeira et al, Amorphous ITO thin films prepared by DC sputtering for electrochromic applications, Thin Solid Films, 420-421, 2002, 70-75.*
(Continued)

*Primary Examiner* — Eli D. Strah
(74) *Attorney, Agent, or Firm* — Westerman, Hattori, Daniels & Adrian, LLP

(57) ABSTRACT

Provided are an acrylic pressure-sensitive adhesive composition including a (meth)acryl-based polymer and a phosphonic acid compound of formula (1):

(Continued)

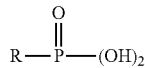

wherein R is a hydrogen atom or a hydrocarbon residue having 1 to 18 carbon atoms which may have an oxygen atom, or a salt thereof, the composition containing 0.005 to 3 parts by weight of the phosphonic acid compound of formula (1) based on 100 parts by weight of the (meth)acryl-based polymer; a pressure-sensitive adhesive layer made from the acrylic pressure-sensitive adhesive composition; a pressure-sensitive adhesive layer-attached substrate film having the pressure-sensitive adhesive layer; a laminate including the pressure-sensitive adhesive layer-attached substrate film; and an image display device including the laminate or the pressure-sensitive adhesive layer-attached substrate film.

17 Claims, 1 Drawing Sheet

(51) Int. Cl.

| | | |
|---|---|---|
| *C09J 133/04* | (2006.01) | |
| *B32B 7/12* | (2006.01) | |
| *B32B 27/06* | (2006.01) | |
| *B32B 27/30* | (2006.01) | |
| *G02B 5/30* | (2006.01) | |
| *C09J 133/06* | (2006.01) | |
| *C09J 7/38* | (2018.01) | |
| *C08K 5/5317* | (2006.01) | |

(52) U.S. Cl.
CPC ............ *C09J 7/385* (2018.01); *C09J 133/04* (2013.01); *C09J 133/06* (2013.01); *G02B 5/3033* (2013.01); *B32B 2307/202* (2013.01); *B32B 2307/21* (2013.01); *B32B 2307/412* (2013.01); *B32B 2307/42* (2013.01); *B32B 2307/702* (2013.01); *B32B 2457/20* (2013.01); *B32B 2457/202* (2013.01); *B32B 2457/208* (2013.01); *C08K 5/5317* (2013.01); *C09J 2203/318* (2013.01); *C09J 2205/102* (2013.01); *Y10T 428/105* (2015.01); *Y10T 428/1036* (2015.01); *Y10T 428/1041* (2015.01); *Y10T 428/1059* (2015.01); *Y10T 428/1077* (2015.01); *Y10T 428/1082* (2015.01)

(58) Field of Classification Search
CPC ........... C09J 2203/318; C09J 2205/102; Y10T 428/1082; Y10T 428/1036; Y10T 428/1059; Y10T 428/1077; Y10T 428/1041; Y10T 428/105; C08K 5/5317; G02B 5/3033; B32B 7/12; B32B 27/06; B32B 27/308; B32B 2457/208; B32B 2457/202; B32B 2457/20; B32B 2307/412; B32B 2307/702; B32B 2307/42; B32B 2307/202; B32B 2307/21
See application file for complete search history.

(56) References Cited

U.S. PATENT DOCUMENTS

| | | |
|---|---|---|
| 2011/0315306 A1 | 12/2011 | Goto et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057231 A1 | 3/2012 | Goto et al. |
| 2012/0058291 A1 | 3/2012 | Kitagawa et al. |
| 2012/0058321 A1* | 3/2012 | Goto .................. B29C 55/026 428/213 |
| 2012/0327512 A1 | 12/2012 | Goto et al. |
| 2012/0329956 A1 | 12/2012 | Prenzel et al. |
| 2013/0093438 A1* | 4/2013 | Hosokawa .............. B32B 7/06 324/661 |
| 2015/0353787 A1 | 12/2015 | Nagata et al. |

FOREIGN PATENT DOCUMENTS

| | | | | |
|---|---|---|---|---|
| GB | 938217 A | | 10/1963 | |
| GB | 2107328 A | * | 4/1983 | .......... C07C 255/00 |
| JP | S51-69644 A | | 6/1976 | |
| JP | 62-243669 A | | 10/1987 | |
| JP | H05-156473 A | | 6/1993 | |
| JP | 8-157795 A | | 6/1996 | |
| JP | 2000-338329 A | | 12/2000 | |
| JP | 2006-83316 A | | 3/2006 | |
| JP | 2007-002111 A | | 1/2007 | |
| JP | 2009-007423 A | | 1/2009 | |
| JP | 2010-144002 A | | 7/2010 | |
| JP | 4691205 B1 | | 6/2011 | |
| JP | 4751481 B1 | | 8/2011 | |
| JP | 2011-225835 A | | 11/2011 | |
| JP | WO 2012014814 A1 | * | 2/2012 | .............. B32B 7/06 |
| JP | 2013-18227 A | | 1/2013 | |
| WO | 99/27029 A1 | | 6/1999 | |
| WO | 2010/100917 A1 | | 9/2010 | |
| WO | 2014/103952 A1 | | 7/2014 | |

OTHER PUBLICATIONS

International Search Report dated Apr. 7, 2015 issued in counterpart international application No. PCT/JP2014/084416(2pages).
Notification of Transmittal of Translation of the International Preliminary Report on Patentability (Form PCT/IB/338) of International Application No. PCT/JP2014/084416 dated Jul. 21, 2016, with Forms PCT/IB/373 and PCT/ISA/237. (6 pages).
Office Action dated Jun. 28, 2017, issued in counterpart Chinese Application No. 201480071879.7, with English translation. (12 pages).

* cited by examiner

ACRYLIC PRESSURE-SENSITIVE ADHESIVE COMPOSITION, ACRYLIC PRESSURE-SENSITIVE ADHESIVE LAYER, PRESSURE-SENSITIVE ADHESIVE LAYER-ATTACHED SUBSTRATE FILM, LAMINATE, AND IMAGE DISPLAY DEVICE

TECHNICAL FIELD

The invention relates to an acrylic pressure-sensitive adhesive composition and an acrylic pressure-sensitive adhesive layer made from the pressure-sensitive adhesive composition. The invention also relates to a pressure-sensitive adhesive layer-attached substrate film including a substrate film and the acrylic pressure-sensitive adhesive layer provided on at least one surface of the substrate film; a laminate including the pressure-sensitive adhesive layer-attached substrate film and a transparent conductive layer-bearing substrate bonded together in such a manner that the pressure-sensitive adhesive layer of the pressure-sensitive adhesive layer-attached substrate film is in contact with the transparent conductive layer of the substrate; and an image display device including the laminate or the pressure-sensitive adhesive layer-attached substrate film.

BACKGROUND ART

In recent years, transparent conductive coatings such as indium tin oxide (ITO) thin coatings have found a wide variety of applications. For example, it is known that a transparent conductive coating is formed as an antistatic layer on one side of the transparent substrate of a liquid crystal cell opposite to its side in contact with the liquid crystal layer in a liquid crystal display device using a liquid crystal cell of an in-plane switching (IPS) type or the like. A transparent conductive coating is also formed on a transparent resin film to form a transparent conductive film, which is used as an electrode substrate to form a touch panel. For example, such a touch panel is used in combination with a liquid crystal display device or image display device for cellular phones, portable music players, or other devices to form an input device, which has become widely spread.

A widely-spread conventional input device including a combination of a touch panel and an image display device is of an out-cell type, in which a transparent conductive film including a transparent substrate made of a glass sheet or a transparent resin film and a transparent conductive layer formed thereon is provided on a liquid crystal display device (above the viewer-side polarizing film of the liquid crystal display device). In recent years, however, various other structures have become known, such as an on-cell type, in which a transparent conductive coating electrode is formed on the upper glass substrate of a liquid crystal cell, and an in-cell type, in which a transparent conductive coating electrode is incorporated in a liquid crystal cell. It is also known that an ITO layer as an antistatic layer for an image display device is used to form a touch sensor, which is patterned to provide a touch panel function.

In some cases, an optical film such as a polarizing film is disposed on such a transparent conductive coating with a pressure-sensitive adhesive layer interposed therebetween. A common pressure-sensitive adhesive is produced using a carboxyl group-containing monomer as a pressure-sensitive adhesive component for increasing the cohesive strength of the pressure-sensitive adhesive. Unfortunately, it is difficult to use such an acid component-containing pressure-sensitive adhesive layer for the above applications because the acid can corrode the transparent conductive layer when the acid component-containing pressure-sensitive adhesive layer comes directly into contact with the transparent conductive layer.

For the solution of the problem of such metal corrosion, there are proposed various pressure-sensitive adhesive compositions having the ability to prevent metal corrosion. Specifically, there are proposed a pressure-sensitive adhesive composition with its acid component content reduced by the addition of a specific amount of a nitrogen atom-containing component (see, for example, Patent Document 1), a pressure-sensitive adhesive composition containing an acidic group-free acrylic resin as a main component (see, for example, Patent Document 2), and a pressure-sensitive adhesive containing a (meth)acryl-based polymer substantially free of any acidic group (see, for example, Patent Document 3).

Now, the liquid crystal display devices and image display devices mentioned above are strongly required to be lighter and thinner, and polarizing films for use in the liquid crystal display devices and so on are also required to be lighter and thinner. Known methods for reducing the weight and thickness of polarizing films include, for example, a method of providing a transparent protective film on only one side of a polarizer to form a one-side-protected polarizing film, and a method of producing a thin polarizing film with a thinner polarizer.

A known method of producing a thin polarizing film includes producing an optical film laminate including: an amorphous ester-based thermoplastic resin substrate in the form of a continuous web; and a thin polarizing coating that is formed on the substrate and includes a polyvinyl alcohol-based resin containing oriented iodine (see, for example, Patent Documents 4 and 5).

PRIOR ART DOCUMENTS

Patent Documents

Patent Document 1: JP-A-2010-144002
Patent Document 2: JP-W-2011-225835
Patent Document 3: JP-A-2013-018227
Patent Document 4: JP-B1-4751481
Patent Document 5: JP-B1-4691205

SUMMARY OF THE INVENTION

Problems to be Solved by the Invention

The pressure-sensitive adhesive compositions disclosed in Patent Documents 1 to 3 contain a reduced amount of an acid component such as a carboxyl group-containing resin or contain no acid component and thus are effective to a certain extent in preventing metal corrosion. Unfortunately, the pressure-sensitive adhesive compositions disclosed in Patent Documents 1 to 3 are not considered to have sufficient performance as pressure-sensitive adhesives, particularly for use on transparent conductive layers, because their acid component content is low so that the cohesive strength of the resin is insufficient and their basic physical properties such as adhering strength and holding power are insufficient.

In some cases, a polarizing film is disposed on a transparent conductive coating with a pressure-sensitive adhesive layer interposed therebetween. In such cases, the resistance of the transparent conductive layer may increase when the polarizing film is an iodine-based polarizing film. It has been found that such an increase in the resistance occurs when iodine leaks from the polarizer to the pressure-sensitive adhesive layer and reaches the transparent conductive layer to corrode the transparent conductive layer.

An iodine-based thin polarizer with a thickness of 10 μm or less, such as that disclosed in Patent Document 4 or 5, needs to have a high iodine concentration in order to have the same level of polarizing properties as conventional polarizes. It has been found that when a polarizing film including a polarizer with such a high iodine concentration is bonded to a transparent conductive layer, iodine can easily corrode the transparent conductive layer. In addition, it has been found that also when a one-side-protected, iodine-based, polarizing film is used, corrosion can easily occur on a transparent conductive layer directly bonded to the iodine-based polarizer with a pressure-sensitive adhesive layer interposed therebetween.

It is therefore an object of the invention to provide an acrylic pressure-sensitive adhesive composition capable of forming a pressure-sensitive adhesive layer that can prevent an adherend such as a transparent conductive layer from being degraded by degradation-inducing substances (such as iodine migrating from an iodine-based polarizer and acid components) when it is placed on the adherend and contains such degradation-inducing substances. It is another object of the invention to provide a pressure-sensitive adhesive layer made from the acrylic pressure-sensitive adhesive composition; a pressure-sensitive adhesive layer-attached substrate film including a substrate film and the pressure-sensitive adhesive layer provided on at least one surface of the substrate film; a laminate including the pressure-sensitive adhesive layer-attached substrate film and a transparent conductive layer-bearing substrate bonded together in such a manner that the pressure-sensitive adhesive layer of the pressure-sensitive adhesive layer-attached substrate film is in contact with the transparent conductive layer of the substrate; and an image display device including the laminate or the pressure-sensitive adhesive layer-attached substrate film.

Means for Solving the Problems

As a result of intensive studies to solve the problems, the inventors have accomplished the invention based on findings that the objects can be achieved by means of the acrylic pressure-sensitive adhesive composition described below.

The invention relates to an acrylic pressure-sensitive adhesive composition, comprising:
a (meth)acryl-based polymer; and
a phosphonic acid compound represented by formula (1):

[Formula 1]

(1)

wherein R is a hydrogen atom or a hydrocarbon residue having 1 to 18 carbon atoms which may have an oxygen atom, or a salt of the phosphonic acid compound,
the acrylic pressure-sensitive adhesive composition containing 0.005 to 3 parts by weight of the phosphonic acid compound represented by formula (1) based on 100 parts by weight of the (meth)acryl-based polymer.

In the acrylic pressure-sensitive adhesive composition, the (meth)acryl-based polymer preferably has a weight average molecular weight of 1,200,000 to 3,000,000.

In the acrylic pressure-sensitive adhesive composition, the (meth)acryl-based polymer preferably comprises monomer units derived from an alkyl (meth)acrylate and a carboxyl group-containing monomer.

The acrylic pressure-sensitive adhesive composition preferably further comprises an isocyanate crosslinking agent.

The acrylic pressure-sensitive adhesive composition is preferably for forming a pressure-sensitive adhesive layer to be in contact with a conductive layer of a conductive layer-bearing conductive substrate.

In the acrylic pressure-sensitive adhesive composition, the conductive layer is preferably a transparent conductive layer, the transparent conductive layer is more preferably made of indium tin oxide.

In the acrylic pressure-sensitive adhesive composition, the indium tin oxide is preferably amorphous indium tin oxide.

The invention relates to an acrylic pressure-sensitive adhesive layer made from the acrylic pressure-sensitive adhesive composition.

The invention relates to a pressure-sensitive adhesive layer-attached substrate film, comprising:
a substrate film; and
the acrylic pressure-sensitive adhesive layer provided on at least one surface of the substrate film.

In the pressure-sensitive adhesive layer-attached substrate film, the substrate film is preferably an iodine-based polarizing film comprising: an iodine-based polarizer containing 1 to 14% by weight of iodine and/or iodide ions; and a transparent protective film provided on at least one surface of the iodine-based polarizer. The iodine-based polarizer preferably contains 3 to 12% by weight of iodine and/or iodide ions.

In the pressure-sensitive adhesive layer-attached substrate film, the iodine-based polarizing film is preferably a one-side-protected polarizing film having the transparent protective film on only one side of the iodine-based polarizer, and the pressure-sensitive adhesive layer is in contact with a surface of the one-side-protected polarizing film where no transparent protective film is provided.

The invention relates to a laminate, comprising:
the pressure-sensitive adhesive layer-attached substrate film; and
a transparent conductive layer-bearing substrate bonded to the pressure-sensitive adhesive layer-attached substrate film in such a manner that the pressure-sensitive adhesive layer of the pressure-sensitive adhesive layer-attached substrate film is in contact with the transparent conductive layer of the substrate.

The invention also relates to an image display device, comprising:
the pressure-sensitive adhesive layer-attached substrate film; and
a liquid crystal panel having a transparent conductive layer, wherein
the pressure-sensitive adhesive layer-attached substrate film and the liquid crystal panel are bonded together in such a manner that the pressure-sensitive adhesive layer of the pressure-sensitive adhesive layer-attached substrate film is in contact with the transparent conductive layer of the liquid crystal panel.

The invention also relates to an image display device comprising the laminate as a touch panel.

Effect of the Invention

The pressure-sensitive adhesive layer made from the acrylic pressure-sensitive adhesive composition of the invention contains the phosphonic acid compound. Therefore, even when the pressure-sensitive adhesive layer is placed on a conductive layer or the like as an adherend, the degradation of the adherend can be prevented due to the presence of the phosphonic acid compound. This is probably because the phosphonic acid compound can selectively adsorb onto the surface of the adherend (such as the surface of the conductive layer) to form a coating layer, which, as a result, can keep degradation-inducing substances (such as iodine migrating from an iodine-based polarizer and acid components) from migrating from the pressure-sensitive adhesive layer to the surface of the adherend and thus prevent the degradation (corrosion) of the surface of the adherend.

DETAILED DESCRIPTION OF THE PREFERRED EMBODIMENTS

1. Acrylic Based Pressure-Sensitive Adhesive Composition

Figure 1:
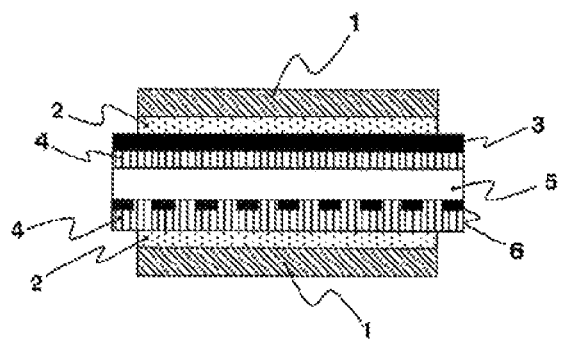
FIG. 1 is a sectional view that schematically illustrates an embodiment of an image display device of the invention.
Figure 2:
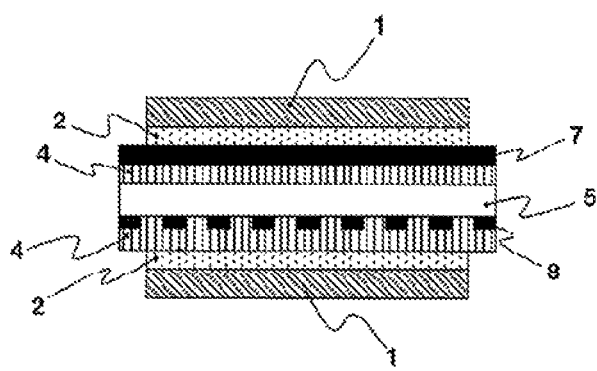
FIG. 2 is a sectional view that schematically illustrates an embodiment of an image display device of the invention.
Figure 3:
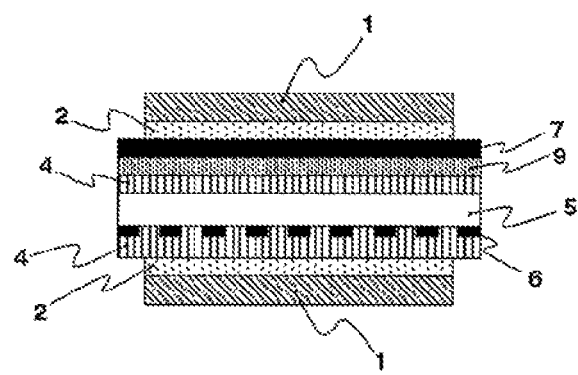
FIG. 3 is a sectional view that schematically illustrates an embodiment of an image display device of the invention.

The acrylic pressure-sensitive adhesive composition of the invention comprises a (meth)acryl-based polymer; and a phosphonic acid compound represented by the following formula (1):

[Formula 2]

(1)

wherein R is a hydrogen atom or a hydrocarbon residue having 1 to 18 carbon atoms which may have an oxygen atom, or a salt of the phosphonic acid compound, the acrylic pressure-sensitive adhesive composition containing 0.005 to 3 parts by weight of the phosphonic acid compound represented by formula (1) based on 100 parts by weight of the (meth)acryl-based polymer.

The phosphonic acid compound used in the invention is represented by the following formula (1).

[Formula (3)]

(1)

In formula (1), R is a hydrogen atom or a hydrocarbon residue having 1 to 18 carbon atoms and optionally containing an oxygen atom. The hydrocarbon residue having 1 to 18 carbon atoms and optionally containing an oxygen atom may be, for example, an alkyl group of 1 to 18 carbon atoms, an alkenyl group of 1 to 18 carbon atoms, or an aryl group of 6 to 18 carbon atoms. The alkyl or alkenyl group may be linear or branched.

In the invention, formula (1) may represent phosphonic acid ($HP(=O)(OH)_2$), in which R is a hydrogen atom. Salts of the phosphonic acid (e.g., metal salts such as sodium, potassium, magnesium salts and an ammonium salt) are also preferably used.

Examples of the phosphonic acid compound represented by formula (1) include phosphonic acid, methylphosphonic acid, ethylphosphonic acid, n-propylphosphonic acid, isopropylphosphonic acid, n-butylphosphonic acid, tert-butylphosphonic acid, sec-butylphosphonic acid, isobutylphosphonic acid, n-pentylphosphonic acid, n-hexylphosphonic acid, isohexylphosphonic acid, n-heptylphosphonic acid, n-octylphosphonic acid, isooctylphosphonic acid, tert-octylphosphonic acid, n-nonylphosphonic acid, n-decylphosphonic acid, isodecylphosphonic acid, n-dodecylphosphonic acid, isododecylphosphonic acid, n-tetradecylphosphonic acid, n-hexadecylphosphonic acid, n-octadecylphosphonic acid, n-eicosylphosphonic acid, cyclobutylphosphonic acid, cyclopentylphosphonic acid, cyclohexylphosphonic acid, norbornylphosphonic acid, phenylphosphonic acid, naphthylphosphonic acid, biphenylphosphonic acid, methoxyphenylphosphonic acid, ethoxyphenylphosphonic acid, and salts thereof. In the invention, these compounds may be used alone or in combination of two or more.

A dimer, trimer, or multimer of the phosphonic acid compound represented by formula (1) is also preferably used.

The content of the phosphonic acid compound is from 0.005 to 3 parts by weight, preferably from 0.01 to 2.5 parts by weight, more preferably from 0.01 to 2 parts by weight, even more preferably from 0.01 to 1.5 parts by weight, further more preferably from 0.01 to 1 part by weight, still more preferably from 0.02 to 1 part by weight, based on 100 parts by weight of the (meth)acryl-based polymer described below. When the content of the phosphonic acid compound falls within the ranges, the degradation of a conductive layer or the like as an adherend can be prevented, and durability to heating and humidification can be improved, which is advantageous. If the content of the phosphonic acid compound is less than 0.005 parts by weight, it may be impossible to sufficiently prevent the degradation of the adherend, so that the adherend may have an increased surface resistance. If the content of the phosphonic acid compound exceeds 3 parts by weight, the durability to heating and humidification may decrease although the degradation of the adherend can be prevented. In the invention, two or more phosphonic acid compounds may be used. In this case, the phosphonic acid compounds should be added in such an amount that the total content of the phosphonic acid compounds falls within the ranges.

The acrylic pressure-sensitive adhesive composition of the invention contains the phosphonic acid compound represented by formula (1). Therefore, even when a pressure-sensitive adhesive layer made from the pressure-sensitive adhesive composition is placed on a conductive layer or the like as an adherend, the degradation (corrosion) of the conductive layer or the like as the adherend can be prevented, and in a case where the adherend is a conductive substrate having a conductive layer, the adherend can be prevented from increasing in surface resistance. This is probably because the phosphonic acid compound can selectively adsorb onto the surface of the adherend (such as the surface of the conductive layer) to form a coating layer, which, as a result, can keep degradation-inducing substances (such as iodine migrating from an iodine-based polarizer and acid components) from migrating from the pressure-sensitive adhesive layer to the surface of the adherend and thus prevent the degradation (corrosion) of the surface of the adherend.

In this case, the corrosion occurs on a metal oxide by a mechanism different from that of generally known metallic corrosion. In the case of a metal oxide such as ITO, iodine derived from a polarizer can infiltrate into the metal oxide layer to lower the carrier mobility of the metal oxide, which can cause an increase in resistance.

The invention is highly effective in preventing the corrosion of a metal oxide as described above and, in particular, has a better effect on a transparent conductive layer including a metal oxide.

The (meth)acryl-based polymer used in the invention is not limited. For example, the (meth)acryl-based polymer is preferably obtained by polymerization of a monomer component containing an alkyl (meth)acrylate. More preferably, the (meth)acryl-based polymer is obtained by polymerization of a monomer component including an alkyl (meth) acrylate and a carboxyl group-containing monomer. As used herein, the term "alkyl (meth)acrylate" refers to an alkyl acrylate and/or an alkyl methacrylate, and "(meth)" is used in the same meaning in the description.

The alkyl group in the alkyl (meth)acrylate may be any of various straight or branched chain alkyl groups. Examples of the alkyl (meth)acrylate include propyl (meth)acrylate, n-butyl (meth)acrylate, isobutyl (meth)acrylate, sec-butyl (meth)acrylate, tert-butyl (meth)acrylate, n-pentyl (meth) acrylate, isopentyl (meth)acrylate, isoamyl (meth)acrylate, n-hexyl (meth)acrylate, heptyl (meth)acrylate, 2-ethylhexyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth)acrylate, tetradecyl (meth) acrylate, stearyl (meth)acrylate, octadecyl (meth)acrylate, dodecyl (meth)acrylate, etc. These may be used alone or in any combination. In particular, alkyl (meth)acrylates having an alkyl group of 4 to 18 carbon atoms are preferred, alkyl (meth)acrylates having an alkyl group of 4 to 10 carbon atoms are more preferred, n-butyl (meth)acrylate and 2-ethylhexyl (meth)acrylate are even more preferred, n-butyl (meth)acrylate is particularly preferred.

The content of the alkyl (meth)acrylate is preferably 50 part by weight or more, more preferably 60 part by weight or more, even more preferably 70 part by weight or more, still more preferably 80 part by weight or more, based on 100 parts by total weight of the monomer component used to form the (meth)acryl-based polymer. The upper limit is preferably, but not limited to, 100 parts by weight or less, more preferably 99 parts by weight or less.

Any monomer having a carboxyl group and an unsaturated double bond-containing polymerizable functional group such as a (meth)acryloyl group or a vinyl group may be used without restriction as the carboxyl group-containing monomer. Examples of the carboxyl group-containing monomer include acrylic acid, methacrylic acid, carboxyethyl (meth)acrylate, carboxypentyl (meth)acrylate, itaconic acid, maleic acid, fumaric acid, and crotonic acid. These may be used alone or in any combination.

The carboxyl group-containing monomer is preferably used in an amount of 10 parts by weight or less, more preferably 0.1 to 10 parts by weight, even more preferably 1 to 7 parts by weight, based on 100 parts by weight of the total weight of the monomer component used to form the (meth)acryl-based polymer. The content of carboxyl group-containing monomer within this range is preferable in order to improve durability.

The monomer component used to form the (meth)acryl-based polymer for use in the invention may include the alkyl (meth)acrylate and optionally the carboxyl group-containing monomer. Besides these monomers, the monomer component may include a hydroxyl group-containing monomer, an alicyclic hydrocarbon ester of (meth)acrylic acid, an aryl (meth)acrylate, or other copolymerizable monomers.

Any monomer having a hydroxyl group and an unsaturated double bond-containing polymerizable functional group such as a (meth)acryloyl group or a vinyl group may be used without restriction as the hydroxyl group-containing monomer. Examples of the hydroxyl group-containing monomer include 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and (4-hydroxymethylcyclohexyl)methyl (meth)acrylate. These may be used alone or in any combination. Among them, 4-hydroxybutyl acrylate is preferred. Preferably, 4-hydroxybutyl acrylate is used as the hydroxyl group-containing monomer, so that when the isocyanate crosslinking agent described below is used, crosslinking points with the isocyanate group of the isocyanate crosslinking agent can be efficiently ensured.

The hydroxyl group-containing monomer is preferably used in an amount of 10 parts by weight or less, more preferably 0.01 to 10 parts by weight, even more preferably 0.05 to 3 parts by weight, based on 100 parts by weight of the total weight of the monomer component used to form the (meth)acryl-based polymer.

The examples of the alicyclic hydrocarbon esters of (meth)acrylic acid include cyclohexyl (meth)acrylate, bornyl (meth)acrylate, and isobornyl (meth)acrylate. The examples of aryl (meth)acrylate include phenyl (meth)acrylate and benzyl (meth)acrylate.

The alicyclic hydrocarbon esters of (meth)acrylic acid is preferably used in an amount of 10 parts by weight or less, more preferably 0.01 to 10 parts by weight, even more preferably 0.05 to 3 parts by weight, based on 100 parts by weight of the total weight of the monomer component used to form the (meth)acryl-based polymer. The aryl (meth) acrylate is preferably used in an amount of 20 parts by weight or less, more preferably 0.1 to 15 parts by weight, even more preferably 1 to 15 parts by weight, based on 100 parts by weight of the total weight of the monomer component used to form the (meth)acryl-based polymer.

The other copolymerizable monomer may be of any type having an unsaturated double bond-containing polymerizable functional group such as a (meth)acryloyl group or a vinyl group, examples of which include vinyl esters such as vinyl acetate and vinyl propionate; styrene monomers such as styrene; epoxy group-containing monomers such as glycidyl (meth)acrylate and methylglycidyl (meth)acrylate; alkoxy group-containing monomers such as methoxyethyl (meth)acrylate and ethoxyethyl (meth)acrylate; cyano group-containing monomers such as acrylonitrile and methacrylonitrile; functional monomers such as 2-methacryloyloxyethyl isocyanate; olefin monomers such as ethylene, propylene, isoprene, butadiene, and isobutylene; vinyl ether monomers such as vinyl ether; halogen atom-containing monomers such as vinyl chloride.

Examples of the copolymerizable monomer also include maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide; and sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid.

Examples of the copolymerizable monomer also include glycol acrylate monomers such as polyethylene glycol (meth)acrylate, polypropylene glycol (meth)acrylate, methoxyethylene glycol (meth)acrylate, and methoxypolypropylene glycol (meth)acrylate; and other monomers such as acrylic ester monomers containing a heterocyclic ring or a halogen atom, such as tetrahydrofurfuryl (meth)acrylate and fluoro(meth)acrylate.

A polyfunctional monomer may also be used as the copolymerizable monomer. The polyfunctional monomer may be a compound having two or more unsaturated double bonds such as those in (meth)acryloyl groups or vinyl groups. Examples that may also be used include (meth) acrylate esters of polyhydric alcohols, such as (mono or poly)alkylene glycol di(meth)acrylates including (mono or poly)ethylene glycol di(meth)acrylates such as ethylene glycol di(meth)acrylate, diethylene glycol di(meth)acrylate, triethylene glycol di(meth)acrylate, trimethylolpropane tri (meth)acrylate, and tetraethylene glycol di(meth)acrylate, (mono or poly)propylene glycol di(meth)acrylate such as propylene glycol di(meth)acrylate, neopentyl glycol di(meth)acrylate, 1,6-hexanediol di(meth)acrylate, pentaerythritol di(meth)acrylate, trimethylolpropane tri(meth)acrylate, pentaerythritol tri(meth)acrylate, and dipentaerythritol hexa(meth)acrylate; polyfunctional vinyl compounds such as divinylbenzene; and compounds having two or more reactive unsaturated double bonds, such as allyl (meth)acrylate and vinyl (meth)acrylate. The polyfunctional monomer may also be a compound having a polyester, epoxy or urethane skeleton to which two or more unsaturated double bonds are added in the form of functional groups such as (meth) acryloyl groups or vinyl groups in the same manner as the monomer component, such as polyester (meth)acrylate, epoxy (meth)acrylate, or urethane (meth)acrylate.

The content of the other copolymerizable monomer is preferably 30 parts by weight or less, more preferably 20 parts by weight or less, even more preferably 15 parts by weight or less, based on 100 parts by weight of the total weight of the monomer component used to form the (meth) acryl-based polymer. If the content of the copolymerizable monomer is too high, the pressure-sensitive adhesive layer of the invention made from the acrylic pressure-sensitive adhesive composition may have degraded pressure-sensitive adhesive properties such as degraded adhesion to various adherends such as glass, films, and transparent conductive layers.

The (meth)acryl-based polymer used in the invention generally has a weight average molecular weight of 900,000 to 3,000,000. In view of durability, the weight average molecular weight is preferably from 1,200,000 to 3,000,000, more preferably from 1,500,000 to 2,500,000. In some cases, a weight average molecular weight of less than 900,000 is not preferred in view of heat resistance. If the weight average molecular weight is more than 3,000,000, a large amount of a dilution solvent for adjusting viscosity can be needed for the application of the composition, which is not preferred for cost reasons. The term "weight average molecular weight" refers to the value calculated as a polystyrene-equivalent molecular weight from a measurement obtained by gel permeation chromatography (GPC). It should be noted that when the pressure-sensitive adhesive is obtained by emulsion polymerization, it generally has a high gel content and cannot be subjected to GPC measurement, which means that it is often difficult to identify the molecular weight by actual measurement.

The (meth)acryl-based polymer described above can be produced, but are not limited to, by any method appropriately selected from known methods such as solution polymerization, bulk polymerization, emulsion polymerization, and various types of radial polymerization. The resulting (meth)acryl-based polymer may be a random copolymer, a block copolymer, a graft copolymer, or any other form.

In a solution polymerization process, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acryl-based polymer may be controlled by the reaction conditions including the amount of addition of the polymerization initiator or the chain transfer agent. The amount of the addition may be controlled as appropriate depending on the type of these materials.

Examples of the polymerization initiator include, but are not limited to, azo initiators such as 2,2'-azobisisobutyronitrile (AIBN), 2,2'-azobis(2-amidinopropane)dihydrochloride, 2,2'-azobis[2-(5-methyl-2-imidazoline-2-yl)propane] dihydrochloride, 2,2'-azobis(2-methylpropionamidine) disulfate, 2,2'-azobis(N,N'-dimethyleneisobutylamidine), and 2,2'-azobis[N-(2-carboxyethyl)-2-methylpropionamidine]hydrate (trade name: VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 2 part by weight, based on 100 parts by total weight of the monomer component used to form the (meth)acryl-based polymer.

Examples of the chain transfer agent include lauryl mercaptan, glycidyl mercaptan, mercaptoacetic acid, 2-mercaptoethanol, thioglycolic acid, 2-ethylhexyl thioglycolate and 2,3-dimercapto-1-propanol. One of these chain transfer agents may be used alone, or two or more thereof may be used in a mixture. The total content of the chain transfer agent is preferably about 0.1 parts by weight or less, based on 100 parts by total weight of the monomer component.

The acrylic pressure-sensitive adhesive composition of the invention may further contain a crosslinking agent. A polyfunctional compound may be used as a crosslinking agent, examples of which include an organic crosslinking agent and a polyfunctional metal chelate. Examples of the organic crosslinking agent include an isocyanate crosslinking agent, an epoxy crosslinking agent, a carbodiimide crosslinking agent, an imine crosslinking agent, an oxazoline crosslinking agent, an aziridine crosslinking agent and a peroxide crosslinking agent, etc. The polyfunctional metal chelate may comprise a polyvalent metal atom and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include an alkyl ester, an alcohol compound, a carboxylic acid compound, an ether compound, and a ketone compound. Among these crosslinking agents, the isocyanate crosslinking agent is preferred because it can provide a cohesive strength that will contribute to the durability of the pressure-sensitive adhesive, and more preferably, the isocyanate crosslinking agent is used in combination with the peroxide crosslinking agent.

Examples of isocyanate crosslinking agent include a compound having two or more isocyanate groups (which may include functional groups that are temporarily protected with an isocyanate blocking agent or by oligomerization and are convertible to isocyanate groups) per molecule.

Isocyanate crosslinking agents include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of isocyanate crosslinking agents include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (trade name: CORONATE L, manufactured by NIPPON POLYURETHANE INDUSTRY CO., LTD.), a trimethylolpropane-hexamethylene diisocyanate trimer adduct (trade name: CORONATE HL, manufactured by NIPPON POLYURETHANE INDUSTRY CO., LTD.), and an isocyanurate of hexamethylene diisocyanate (trade name: CORONATE HX, manufactured by NIPPON POLYURETHANE INDUSTRY CO., LTD.); a trimethylolpropane adduct of xylylene diisocyanate (trade name: D110N, manufactured by Mitsui Chemicals, Inc.) and a trimethylolpropane adduct of hexamethylene diisocyanate (trade name: D160N, manufactured by Mitsui Chemicals, Inc.); polyether polyisocyanate and polyester polyisocyanate; adducts thereof with various polyols; and polyisocyanates polyfunctionalized with an isocyanurate bond, a biuret bond, an allophanate bond, or the like.

The content of the isocyanate crosslinking agent is preferably, but not limited to, about 10 parts by weight or less (on a solids basis) based on 100 parts by weight (on a solids basis) of the (meth)acryl-based polymer. The content of the isocyanate crosslinking agent is more preferably about 0.01 to 10 parts by weight, even more preferably about 0.01 to 5 parts by weight, further more preferably about 0.01 to 1 part by weight.

As the peroxide crosslinking agent, various kinds of peroxides are used. Examples of the peroxide include di-(2-ethylhexyl)peroxydicarbonate, di(4-t-butylcyclohexyl) peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxyisobutyrate, 1,1,3,3-tetramethylbutylperoxy 2-ethylhexanoate, di-(4-methylbenzoyl) peroxide, dibenzoyl peroxide and t-butyl peroxyisobutyrate. Among them, particularly, di(4-t-butylcyclohexyl)peroxydicarbonate, dilauroyl peroxide and dibenzoyl peroxide, which are excellent in crosslinking reaction efficiency, are preferably used.

When the peroxide crosslinking agent is used, its content is preferably from about 10 parts by weight or less, more preferably from about 0.01 to 1 parts by weight, even more preferably about 0.03 to 0.5 parts by weight, based on 100 parts by weight (solid basis) of the (meth)acryl-based polymer.

The content of the crosslinking agent other than the isocyanate crosslinking agent and peroxide crosslinking agent is preferably about 10 parts by weight or less based on 100 parts by weight (solid basis) of the (meth)acryl-based polymer.

To improve adhesion under high-temperature, high-humidity conditions, any of various silane coupling agents may be added to the acrylic pressure-sensitive adhesive composition of the invention. Silane coupling agents having any appropriate functional group may be used. Examples of such a functional group include vinyl, epoxy, amino, mercapto, (meth)acryloxy, acetoacetyl, isocyanate, styryl, and polysulfide groups. Examples of the silane coupling agent include a vinyl group-containing silane coupling agent such as vinyltriethoxysilane, vinyltripropoxysilane, vinyltriisopropoxysilane, or vinyltributoxysilane; an epoxy group-containing silane coupling agent such as γ-glycidoxypropyltrimethoxysilane, γ-glycidoxypropyltriethoxysilane, 3-glycidoxypropylmethyldiethoxysilane, or 2-(3,4-epoxycyclohexyl)ethyltrimethoxysilane; an amino group-containing silane coupling agent such as γ-aminopropyltrimethoxysilane, N-β-(aminoethyl)-γ-aminopropylmethyldimethoxysilane, N-(2-aminoethyl)3-aminopropylmethyldimethoxysilane, γ-triethoxysilyl-N-(1,3-dimethylbutylidene)propylamine, or N-phenyl-γ-aminopropyltrimethoxysilane; a mercapto group-containing silane coupling agent such as γ-mercaptopropylmethyldimethoxysilane, a styryl group-containing silane coupling agent such as p-styryltrimethoxysilane; a (meth)acrylic group-containing silane coupling agent such as γ-acryloxypropyltrimethoxysilane or γ-methacryloxypropyltriethoxysilane; an isocyanate group-containing silane coupling agent such as 3-isocyanatepropyltriethoxysilane; and a polysulfide group-containing silane coupling agent such as bis(triethoxysilylpropyl)tetrasulfide.

The silane coupling agents may be used alone or in combination of two or more. Based on 100 parts by weight of the all monomer component used to form the (meth)acryl-based polymer, the total content of the silane coupling agent(s) is preferably 1 part by weight or less, more preferably from 0.01 to 1 part by weight, even more preferably from 0.02 to 0.8 parts by weight, still more preferably from 0.05 to 0.7 parts by weight. If the content of the silane coupling agent is more than 1 part by weight, part of the coupling agent may remain unreacted, which is not preferred in view of durability.

When the silane coupling agent is radically copolymerizable with the above monomer component, it may be used as one of the monomer components. In such a case, the content of the silane coupling agent is preferably from 0.005 to 0.7 parts by weight based on 100 parts by weight of the all monomer component used to form the (meth)acryl-based polymer.

The acrylic pressure-sensitive adhesive composition of the invention also preferably contains an ionic compound in order to prevent electrification of films during operation processes.

The ionic compound to be used is preferably an alkali metal salt and/or an organic cation-anion salt. Any of organic and inorganic salts of alkali metals may be used as the alkali metal salt. As used herein, the term "organic cation-anion salt" refers to an organic salt including an organic cation moiety, in which the anion moiety may be organic or inorganic. The "organic cation-anion salt" is also referred to as the ionic liquid or the ionic solid.

<Alkali Metal Salt>

The cation moiety of the alkali metal salt includes an alkali metal ion, which may be any of lithium, sodium, and potassium ions. Among these alkali metal ions, lithium ion is particularly preferred.

The anion moiety of the alkali metal salt may include an organic material or an inorganic material. Examples of the anion moiety that may be used to form the organic salt include $CH_3COO^-$, $CF_3COO^-$, $CH_3SO_3^-$, $CF_3SO_3^-$, $(CF_3SO_2)_3C^-$, $C_4F_9SO_3^-$, $C_3F_7COO^-$, $(CF_3SO_2)(CF_3CO)N^-$, $^-O_3S(CF_2)_3SO_3^-$, $PF_6^-$, and $CO_3^{2-}$, and those represented by the following general formulae (4) to (7):

(4) $(C_nF_{2n+1}SO_2)_2N^-$, wherein n is an integer of 1 to 10;
(5) $CF_2(C_mF_{2m}SO_2)_2N^-$, wherein m is an integer of 1 to 10;
(6) $^-O_3S(CF_2)_lSO_3^-$, wherein l is an integer of 1 to 10; and
(7) $(C_pF_{2p+1}SO_2)N^- (C_qF_{2q+1}SO_2)$, wherein p and q are each an integer of 1 to 10. In particular, a fluorine atom-containing anion moiety is preferably used because it can form an ionic compound with good ionic dissociation properties. Examples of the anion moiety that may be used to form the inorganic salt include $Cl^-$, $Br^-$, $I^-$, $AlCl_4^-$, $Al_2Cl_7^-$, $BF_4^-$, $PF_6^-$, $ClO_4^-$, $NO_3^-$, $AsF_6^-$, $SbF_6^-$, $NbF_6^-$, $TaF_6^-$, and $(CN)_2N^-$. The anion moiety is preferably (perfluoroalkylsulfonyl) imide represented by the general formula (4), such as $(CF_3SO_2)_2N^-$ or $(C_2F_5SO_2)_2N^-$, in particular, preferably (trifluoromethanesulfonyl)imide such as $(CF_3SO_2)_2N^-$.

Examples of organic salts of alkali metals include sodium acetate, sodium alginate, sodium lignosulfonate, sodium toluenesulfonate, lithium hexafluorophosphate ($LiPF_6$), $LiCF_3SO_3$, $Li(CF_3SO_2)_2N$, $Li(CF_3SO_2)_2N$, $Li(C_2F_5SO_2)_2N$, $Li(C_4F_9SO_2)_2N$, $Li(CF_3SO_2)_3C$, $KO_3S(CF_2)_3SO_3K$, and $LiO_3S(CF_2)_3SO_3K$. Among them, lithium hexafluorophosphate ($LiPF_6$), $LiCF_3SO_3$, $Li(CF_3SO_2)_2N$, $Li(C_2F_5SO_2)_2N$, $Li(C_4F_9SO_2)_2N$, $Li(CF_3SO_2)_3C$, and the like are preferred, fluorine-containing lithium imide salts such as $Li(CF_3SO_2)_2N$, $Li(C_2F_9SO_2)_2N$, and $Li(C_4F_9SO_2)_2N$ are more preferred, and lithium hexafluorophosphate (LiPF6), lithium bistrifluoromethanesulfonyl imide (LiTFSI, Li $(CF_3SO_2)_2N$) is particularly preferred.

Examples of inorganic salts of alkali metals include lithium perchlorate and lithium iodide.

<Organic Cation-Anion Salt>

The organic cation-anion salt that may be used in the invention includes a cationic component and an anionic component, in which the cationic component includes an organic material. Examples of the cationic component include a pyridinium cation, a piperidinium cation, a pyrrolidinium cation, a pyrroline skeleton-containing cation, a pyrrole skeleton-containing cation, an imidazolium cation, a tetrahydropyridinium cation, a dihydropyridinium cation, a pyrazolium cation, a pyrazolinium cation, a tetraalkylammonium cation, a trialkylsulfonium cation, and a tetraalkylsulfonium cation.

Examples of the anionic component that may be used include $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO-$, $CF_3COO^-$, $CH_3SO_3^-$, $CF_3SO_3^-$, $(CF_3SO_2)_3C^-$, $AsF_6^-$, $SbF_6^-$, $NbF_6^-$, $TaF_6^-$, $(CN)_2N^-$, $C_4F_9SO_3^-$, $C_3F_7COO^-$, $(CF_3SO_2)(CF_3CO)N^-$, and $^-O_3S(CF_2)_3SO_3^-$, and those represented by the following general formulae (4) to (7):

(4) $(CF_nF_{2n+1}SO_2)_2N^-$, wherein n is an integer of 1 to 10;
(5) $CF_2(C_mF_{2m}SO_2)_2N^-$, wherein m is an integer of 1 to 10;
(6) $^-O_3S(CF_2)_lSO_3^-$, wherein l is an integer of 1 to 10; and
(7) $(C_pF_{2p+1}SO_2)N^- (C_qF_{2q+1}SO_2)$, wherein p and q are each an integer of 1 to 10. In particular, a fluorine atom-containing anionic component is preferably used because it can form an ionic compound with good ionic dissociation properties.

Examples of the organic cation-anion salt that may be used include compounds appropriately selected from combinations of the above cationic and anionic components. Examples thereof include, such as 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethanesulfonyl)imide, 1-butyl-3-methylpyridinium bis(pentafluoroethanesulfonyl) imide, 1-hexylpyridinium tetrafluoroborate, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-metylpyrazolium tetrafluoroborate, 3-methylpyrazolium tetrafluoroborate, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoroethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(trifluoromethanesulfonyl)imide, N,N-diethyl-N-methyl-N-(2-methoxyethyl)ammonium bis(pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N,N-diethyl-N-methyl-N-(2-methoxyethyl)ammonium (trifluoromethanesulfonyl)trifluoroacetamide, diallyldimethylammonium (trifluoromethanesulfonyl)trifluoroacetamide, glycidyl trimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, N-methyl-N-ethyl-N-propyl-N-pentylammonium bis(trifluoromethanesulfonyl)imide, and 1-butyl-3-methylpyridine-1-ium trifluoromethanesulfonate. Commercially available products of the above may be used, examples of which include CIL-314 manufactured by Japan Carlit Co., Ltd. and ILA2-1 manufactured by KOEI CHEMICAL COMPANY LIMITED.

Examples thereof also include tetramethylammonium bis(trifluoromethanesulfonyl)imide, trimethylethylammonium bis(trifluoromethanesulfonyl)imide, trimethylbutylammonium bis(trifluoromethanesulfonyl)imide, trimethylpentylammonium bis(trifluoromethanesulfonyl)imide, trimethylheptylammonium bis(trifluoromethanesulfonyl)imide, trimethyloctylammonium bis(trifluoromethanesulfonyl)imide, tetraethylammonium bis(trifluoromethanesulfonyl)imide, triethylbutylammonium bis(trifluoromethanesulfonyl)imide, tetrabutylammonium bis(trifluoromethanesulfonyl)imide, and tetrahexylammonium bis(trifluoromethanesulfonyl)imide.

Examples thereof further include 1-dimethylpyrrolidinium bis(trifluoromethanesulfonyl)imide, 1-methyl-1-ethylpyrrolidinium bis(trifluoromethanesulfonyl)imide, 1-methyl-1-propylpyrrolidinium bis(trifluoromethanesulfonyl)imide, 1-methyl-1-butylpyrrolidinium bis(trifluoromethanesulfonyl)imide, 1-methyl-1-pentylpyrrolidinium bis(trifluoromethanesulfonyl)imide, 1-methyl-1-hexylpyrrolidinium bis(trifluoromethanesulfonyl)imide, 1-methyl-1-heptylpyrrolidinium bis(trifluoromethanesulfonyl)imide, 1-ethyl-1-propylpyrrolidinium bis(trifluoromethanesulfonyl)imide, 1-ethyl-1-butylpyrrolidinium bis(trifluoromethanesulfonyl)imide, 1-ethyl-1-pentylpyrrolidinium bis(trifluoromethanesulfonyl)imide, 1-ethyl-1-hexylpyrrolidinium bis(trifluoromethanesulfonyl)imide, 1-ethyl-1-heptylpyrrolidinium bis(trifluoromethanesulfonyl)imide, 1,1-dipropylpyrrolidinium bis(trifluoromethanesulfonyl)imide, 1-propyl-1-butylpyrrolidinium bis(trifluoromethanesulfonyl)imide, 1,1-dibutylpyrrolidinium bis(trifluoromethanesulfonyl)imide, 1-propylpiperidinium bis(trifluoromethanesulfonyl)imide, 1-pentylpiperidinium bis(trifluoromethanesulfonyl)imide, 1,1-dimethylpiperidinium bis(trifluoromethanesulfonyl)imide, 1-methyl-1-ethylpiperidinium bis(trifluoromethanesulfonyl)imide, 1-methyl-1-propylpiperidinium bis(trifluoromethanesulfonyl)imide, 1-methyl-1-butylpiperidinium bis(trifluoromethanesulfonyl)imide, 1-methyl-1-pentylpiperidinium bis(trifluoromethanesulfonyl)imide, 1-methyl-1-hexylpiperidinium bis(trifluoromethanesulfonyl)imide, 1-methyl-1-heptylpiperidinium bis(trifluoromethanesulfonyl)imide, 1-ethyl-1-propylpiperidinium bis(trifluoromethanesulfonyl)imide, 1-ethyl-1-butylpiperidinium bis(trifluoromethanesulfonyl)imide, 1-ethyl-1-pentylpiperidinium bis(trifluoromethanesulfonyl)imide, 1-ethyl-1-hexylpiperidinium bis(trifluoromethanesulfonyl)imide, 1-ethyl-1-heptylpiperidinium bis(trifluoromethanesulfonyl)imide, 1,1-dipropylpiperidinium bis(trifluoromethanesulfonyl)imide, 1-propyl-1-butylpiperidinium bis(trifluoromethanesulfonyl)imide, 1,1-dibutylpiperidinium bis(trifluoromethanesulfonyl)imide, 1,1-dimethylpyrrolidinium bis(pentafluoroethanesulfonyl)imide, 1-methyl-1-ethylpyrrolidinium bis(pentafluoroethanesulfonyl)imide, 1-methyl-1-propylpyrrolidinium bis(pentafluoroethanesulfonyl)imide, 1-methyl-1-butylpyrrolidinium bis(pentafluoroethanesulfonyl)imide, 1-methyl-1-pentylpyrrolidinium bis(pentafluoroethanesulfonyl)imide, 1-methyl-1-hexylpyrrolidinium bis(pentafluoroethanesulfonyl)imide, 1-methyl-1-heptylpyrrolidinium bis(pentafluoroethanesulfonyl)imide, 1-ethyl-1-propylpyrrolidinium bis(pentafluoroethanesulfonyl)imide, 1-ethyl-1-butylpyrrolidinium bis(pentafluoroethanesulfonyl)imide, 1-ethyl-1-pentylpyrrolidinium bis(pentafluoroethanesulfonyl)imide, 1-ethyl-1-hexylpyrrolidinium bis(pentafluoroethanesulfonyl)imide, 1-ethyl-1-heptylpyrrolidinium bis(pentafluoroethanesulfonyl)imide, 1,1-dipropylpyrrolidinium bis(pentafluoroethanesulfonyl)imide, 1-propyl-1-butylpyrrolidinium bis(pentafluoroethanesulfonyl)imide, 1,1-dibutylpyrrolidinium bis(pentafluoroethanesulfonyl)imide, 1-propylpiperidinium bis(pentafluoroethanesulfonyl)imide, 1-pentylpiperidinium bis(pentafluoroethanesulfonyl)imide, 1,1-dimethylpiperidinium bis (pentafluoroethanesulfonyl)imide, 1-methyl-1-ethylpiperidinium bis(pentafluoroethanesulfonyl)imide, 1-methyl-1-propylpiperidinium bis(pentafluoroethanesulfonyl)imide, 1-methyl-1-butylpiperidinium bis(pentafluoroethanesulfonyl)imide, 1-methyl-1-pentylpiperidinium bis(pentafluoroethanesulfonyl)imide, 1-methyl-1-hexylpiperidinium bis(pentafluoroethanesulfonyl)imide, 1-methyl-1-heptylpiperidinium bis(pentafluoroethanesulfonyl)imide, 1-ethyl-1-propylpiperidinium bis(pentafluoroethanesulfonyl)imide, 1-ethyl-1-heptylpiperidinium bis(pentafluoroethanesulfonyl)imide, 1-ethyl-1-pentylpiperidinium bis(pentafluoroethanesulfonyl)imide, 1-ethyl-1-hexylpiperidinium bis(pentafluoroethanesulfonyl)imide, 1-ethyl-1-heptylpiperidinium bis(pentafluoroethanesulfonyl)imide, 1-propyl-1-butylpiperidinium bis(pentafluoroethanesulfonyl) imide, 1,1-dipropylpiperidinium bis(pentafluoroethanesulfonyl)imide, and 1,1-dibutylpiperidinium bis(pentafluoroethanesulfonyl)imide.

Examples thereof further include derivatives of the above compounds, in which the cation moiety is replaced by trimethylsulfonium cation, triethylsulfonium cation, tributylsulfonium cation, trihexylsulfonium cation, diethylmethylsulfonium cation, dibutylethylsulfonium cation, dimethyldecylsulfonium cation, tetramethylphosphonium cation, tetraethylphosphonium cation, tetrabutylphosphonium cation, or tetrahexylphosphonium cation.

Examples thereof further include derivatives of the above compounds, in which bis(trifluoromethanesulfonyl)imide is replaced by bis(pentafluorosulfonyl)imide, bis(heptafluoropropanesulfonyl)imide, bis(nonafluorobutanesulfonyl) imide, trifluoromethanesulfonylnonafluorobutanesulfonylimide, heptafluoropropanesulfonyltrifluoromethanesulfonylimide, pentafluoroethanesulfonylnonafluorobutanesulfonylimide, or cyclo-hexafluoropropane-1,3-bis(sulfonyl)imide anion.

Besides the alkali metal salts and the organic cation-anion salts, examples of the ionic compound further include inorganic salts such as ammonium chloride, aluminum chloride, copper chloride, ferrous chloride, ferric chloride, and ammonium sulfate. These ionic compounds may be used alone or in combination of two or more.

The content of the ionic compound in the acrylic pressure-sensitive adhesive composition of the invention is preferably, but not limited to, about 10 parts by weight or less, more preferably about 7 parts by weight or less, even more preferably about 5 parts by weight or less, based on 100 parts by weight (solid basis) of the (meth)acryl-based polymer. The lower limit is preferably, but not limited to, about 0.01 parts by weight or more.

If necessary, the acrylic pressure-sensitive adhesive composition of the invention may appropriately contain any of various additives such as viscosity modifiers, release modifiers, tackifiers, plasticizers, softeners, glass fibers, glass beads, metal powders, fillers made of other inorganic powders, pigments, colorants (such as pigments and dyes), pH regulators (acids or bases), antioxidants, and ultraviolet absorbers without departing from the objects of the invention. Any of these additives may also be added in the form of an emulsion. Any of these additives may be added to such an extent that the effects of the invention are not impaired. For example, the content of any of these additives is preferably, but not limited to, about 10 parts by weight or less based on 100 parts by weight (on a solid basis) of the (meth)acryl-based polymer.

The acrylic pressure-sensitive adhesive composition of the invention is suitable as a pressure-sensitive adhesive composition for forming a pressure-sensitive adhesive layer to be in contact with the conductive layer of a conductive layer-bearing conductive substrate. In this regard, the conductive layer may be a thin film of a metal such as Cu or Ag, or the transparent conductive layer described below.

2. Acrylic Pressure-Sensitive Adhesive Layer

The acrylic pressure-sensitive adhesive layer of the invention is made from the acrylic pressure-sensitive adhesive composition described above. The method of forming the acrylic pressure-sensitive adhesive layer may be as described below.

3. Pressure-Sensitive Adhesive Layer-Attached Substrate Film

The pressure-sensitive adhesive layer-attached substrate film of the invention includes a substrate film and the acrylic pressure-sensitive adhesive layer provided on at least one surface of the substrate film.

The substrate film is typically, but not limited to, a release film, a transparent resin film substrate, or any of various other substrates. Specific examples thereof that are suitable for use include those described herein.

The substrate film to be used is also preferably an iodine-based polarizing film that includes an iodine-based polarizer containing 1 to 14% by weight of iodine and/or iodide ions and a transparent protective film provided on at least one surface of the iodine-based polarizer. Hereinafter, the iodine-based polarizing film will be described.

The iodine-based polarizing film includes an iodine-based polarizer containing 1 to 14% by weight of iodine and/or iodide ions and a transparent protective film provided on at least one surface of the iodine-based polarizer. In the invention, the iodine-based polarizing film may be a one-side-protected polarizing film, which includes an iodine-based polarizer and a transparent protective film provided on one surface of the polarizer, or a double-side-protected polarizing film, which includes an iodine-based polarizer and transparent protective films provided on both surfaces of the polarizer. In particular, the effects of the invention are remarkable when a one-side-protected polarizing film is used. Even in the case where a double-side-protected polarizing film is used, the effects of the invention are also remarkable when the transparent protective film in contact with the pressure-sensitive adhesive layer is relatively thin (e.g., 25 μm or less in thickness). In this regard, when the polarizing film is a one-side-protected polarizing film, the pressure-sensitive adhesive layer may be provided directly on the surface of the polarizer opposite to its surface on which the transparent protective film is provided.

The iodine-based polarizer to be used may be any type of polarizer containing 1 to 14% by weight of iodine and/or iodide ions. For example, the iodine-based polarizer may be a product produced by a process including adsorbing iodine to a hydrophilic polymer film such as a polyvinyl alcohol (PVA)-based film, a partially-formalized PVA-based film, or a partially-saponified, ethylene-vinyl acetate copolymer-based film and uniaxially stretching the film. In particular, the polarizer preferably includes a PVA-based film and iodine. The thickness of the polarizers is generally, but not limited to, about 5 to about 80 μm.

A polarizer that is uniaxially stretched after a PVA-based film dyed with iodine is obtained by stretching a PVA-based film by 3 to 7 times the original length, after dipped and dyed in aqueous solution of iodine. If needed the film may also be dipped in aqueous solutions containing boric acid and potassium iodide, which may include zinc sulfate, zinc chloride. Furthermore, before dyeing, the PVA-based film may be dipped in water and rinsed if needed. By rinsing PVA-based film with water, effect of preventing un-uniformity, such as unevenness of dyeing, is expected by making PVA-based film swelled in addition that also soils and blocking inhibitors on the PVA-based film surface may be washed off. Stretching may be applied after dyed with iodine or may be applied concurrently, or conversely dyeing with iodine may be applied after stretching. Stretching is applicable in aqueous solutions containing boric acid and potassium iodide, and in water bath.

In the invention, a thin iodine-based polarizer with a thickness of 10 μm or less may also be used. In view of thickness reduction, the thickness is preferably from 1 to 7 μm. Such a thin iodine-based polarizer is less uneven in thickness, has good visibility, and is less dimensionally-variable, and thus has high durability. It is also preferred because it can form a thinner polarizing film.

Typical examples of the thin type polarizer include thin type polarizing films described in publications of JP-A-51-069644 and JP-A-2000-338329, the pamphlet of WO2010/100917, the specification of Japanese Patent No. 4751481, and the publication of JP-A-2012-073563. These thin type polarizing films can be obtained by a producing method including the step of stretching a PVA-based resin layer and a resin substrate for stretching in the state that these are laminated on each other, and the step of dyeing the resultant laminate. According to this producing method, the PVA based resin layer can be stretched without causing inconveniences by the stretching, such as breaking, even when the PVA based resin layer is thin, because the PVA based resin layer is supported by the resin substrate for stretching.

Among thin type polarizing films as described above, which are obtained by the method including the step of stretching in the state of a laminate and the step of dyeing the laminate, preferred is one obtained by a method including a step of stretching such a laminate in an aqueous boric acid solution, as described in the pamphlet of WO 2010/100917, or the specification of Japanese Patent No. 4751481 or the publication of JP-A-2012-073563, since the laminate can be stretched into a high stretching ratio and improved in polarizing performance. Particularly preferred is a polarizing film obtained by the method described in the specification of Japanese Patent No. 4751481 or the publication of JP-A-2012-073563, which includes the step of stretching such a laminate subsidiarily in the air before the laminate is stretched in an aqueous boric acid solution.

The content of iodine and/or iodide ions in the iodine-based polarizer (hereinafter also referred to as the iodine content) used in the invention is from 1 to 14% by weight and may be from 3 to 12% by weight or from 4 to 7.5% by weight based on the weight of the polarizer. Even when the iodine content of the iodine-based polarizer falls within the high range as mentioned above, the pressure-sensitive adhesive layer-attached substrate film of the invention can prevent the increase in the surface resistance of the transparent conductive layer placed on the pressure-sensitive adhesive layer-attached substrate film. This is probably because the phosphonic acid compound in the pressure-sensitive adhesive layer can selectively adsorb onto the transparent conductive layer to form a coating layer, which can prevent iodine from migrating to the surface of the transparent conductive layer when the iodine migrates from the iodine-based polarizing film to the pressure-sensitive adhesive layer, so that the transparent conductive layer can be protected from corrosion and prevented from increasing in surface resistance.

The transparent protective film or films on one or both sides of the iodine-based polarizer are preferably made of a material having a high level of transparency, mechanical strength, thermal stability, water barrier properties, isotropy, and other properties. Examples of such a material include polyester polymers such as polyethylene terephthalate and polyethylene naphthalate, cellulose polymers such as diacetyl cellulose and triacetyl cellulose, acryl-based polymers such as polymethyl methacrylate, styrene polymers such as polystyrene and acrylonitrile-styrene copolymers (AS resins), polycarbonate polymers, etc. Examples of polymers that may be used to form the transparent protective films also include polyolefin polymers such as polyethylene, polypropylene, cyclo- or norbornene-structure-containing polyolefin, and ethylene-propylene copolymers, vinyl chloride polymers, amide polymers such as nylon and aromatic polyamide, imide polymers, sulfone polymers, polyether sulfone polymers, polyether ether ketone polymers, polyphenylene sulfide polymers, vinyl alcohol polymers, vinylidene chloride polymers, vinyl butyral polymers, arylate polymers, polyoxymethylene polymers, epoxy polymers, or any blends of the above polymers. The transparent protective film may also be a layer formed by curing a curable resin such as a thermosetting or ultraviolet-curable resin such as an acrylic, urethane, acrylic urethane, epoxy, or silicone resin.

The thickness of the protective film may be determined as appropriate. Generally, the thickness of the protective film is from about 1 to about 500 μm in view of strength, workability such as handleability, and thin film formability.

The iodine-based polarizer and the transparent protective film are generally bonded with a water-based adhesive or the like interposed therebetween. Examples of the water-based adhesive include isocyanate adhesives, polyvinyl alcohol-based adhesives, gelatin-based adhesives, vinyl-based latex-based adhesives, water-based polyurethane adhesives, and water-based polyester adhesives. Besides the above, ultraviolet ray-curable adhesives, electron beam-curable adhesives, or the like may also be used to bond the polarizer and the transparent protective film together. Electron beam-curable adhesives for polarizing films have good tackiness to the various transparent protective films described above. The adhesive for use in the invention may also contain a metal compound filler.

The surface of the transparent protective film opposite to its surface to be bonded to the iodine-based polarizer may have undergone the formation of a hard coat layer, an anti-reflection treatment, an anti-sticking treatment, or a treatment for diffusion or antiglare properties.

In order to meet a demand for a reduction in the thickness of the pressure-sensitive adhesive layer-attached substrate film, the total thickness of the iodine-based polarizing film used in the invention is preferably 90 μm or less, more preferably 80 μm or less, even more preferably 70 μm or less, further more preferably 60 μm or less. The lower limit of the total thickness of the polarizing film is, for example, but not limited to, 10 μm.

The pressure-sensitive adhesive layer-attached substrate film of the invention can be obtained by forming a pressure-sensitive adhesive layer from the acrylic pressure-sensitive adhesive composition on at least one surface of the substrate film such as the iodine-based polarizing film.

The pressure-sensitive adhesive layer may be formed by any method, such as a method that includes applying the acrylic pressure-sensitive adhesive composition onto any of various substrates, drying the composition using a dryer such as a heating oven to remove the solvent and other volatile materials to form a pressure-sensitive adhesive layer, and transferring the pressure-sensitive adhesive layer onto the substrate film such as the iodine-based polarizing film; or a method that includes applying the acrylic pressure-sensitive adhesive composition directly onto the substrate film such as the iodine-based polarizing film to form a pressure-sensitive adhesive layer.

For example, the substrate may be, but is not limited to, a release film, a transparent resin film, or any of various other substrates.

Any of various methods may be used to apply, to the substrate or the polarizing film, the pressure-sensitive adhesive composition. Examples include fountain coater, roll coating, kiss roll coating, gravure coating, reverse coating, roll brushing, spray coating, dip roll coating, bar coating, knife coating, air knife coating, curtain coating, lip coating, and extrusion coating with a die coater or the like.

The drying conditions (temperature and time) are not limited and may be appropriately selected depending on the components, concentration, or other features of the acrylic pressure-sensitive adhesive composition. For example, the drying conditions may be about 80 to about 170° C. and 1 to 60 minutes, preferably 90 to 200° C. and 2 to 30 minutes.

The thickness of the pressure-sensitive adhesive layer (after the drying) is, for example, preferably from 5 to 100 µm, more preferably from 10 to 60 µm, even more preferably from 12 to 40 µm. If the pressure-sensitive adhesive layer has a thickness of less than 10 µm, it may have lower adhesion to the adherend and tend to have insufficient durability in a high-temperature or high-temperature, high-humidity environment. If the pressure-sensitive adhesive layer has a thickness of more than 100 µm, the acrylic pressure-sensitive adhesive composition may fail to be sufficiently dried in the process of forming the pressure-sensitive adhesive layer by application and drying, so that air bubbles may remain or thickness irregularities may occur on the surface of the pressure-sensitive adhesive layer, which may easily produce a problem with appearance.

Examples of the material used to form the release film include a resin film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A resin film is preferably used, because of its good surface smoothness.

Examples of the resin film include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release film is generally from 5 to 200 µm, preferably from about 5 to about 100 µm. If necessary, the release film may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the release film is appropriately subjected to a release treatment such as a silicone treatment, a long-chain alkyl treatment, or a fluorine treatment, the releasability from the pressure-sensitive adhesive layer can be further increased.

The transparent resin film substrate to be used may be, but not limited to, various transparent resin films. The resin film is generally formed of a monolayer film. Examples of the material for the transparent resin film substrate include polyester resins such as polyethylene terephthalate and polyethylene naphthalate, acetate resins, polyethersulfone resins, polycarbonate resins, polyamide resins, polyimide resins, polyolefin resins, (meth) acrylic resins, polyvinyl chloride resins, polyvinylidene chloride resins, polystyrene resins, polyvinyl alcohol resins, polyarylate resins, and polyphenylene sulfide resins. In particular, polyester resins, polyimide resins, and polyethersulfone resins are preferred.

The film substrate preferably has a thickness of 15 to 200 µm.

An anchor layer may also be provided between the iodine-based polarizing film and the pressure-sensitive adhesive layer. Examples of the material used to form the anchor layer include, but are not limited to, various polymers, metal oxide sols, and silica sols. In particular, polymers are preferably used. The polymers to be used may be of any of solvent-soluble, water-dispersible, and water-soluble types.

Examples of the polymers include polyurethane resins, polyester resins, acrylic resins, polyether resins, cellulose resins, polyvinyl alcohol resins, polyvinylpyrrolidone, and polystyrene resins. In particular, polyurethane resins, polyester resins, and acrylic resins are preferred. Any appropriate crosslinking agent may be added to any of these resins. Besides the above, one or more binder components may be appropriately used depending on the intended use.

When the anchor layer is made from a water-dispersible material, a water-dispersible polymer may be used. The water-dispersible polymer may be in the form of an emulsion, which is prepared by emulsifying polyurethane, polyester, or any other resin with an emulsifying agent, or may be a self-emulsified resin prepared by introducing a water-dispersible anionic, cationic, or nonionic group into the resin.

The anchor agent may contain an antistatic agent. The antistatic agent may be of any type as long as it can impart electrical conductivity. Examples thereof include ionic surfactants, conductive polymers, metal oxides, carbon black, and carbon nanomaterials. In particular, conductive polymers are preferred, and water-dispersible conductive polymers are more preferred.

Examples of the water-soluble conductive polymer include polyaniline sulfonic acid (with a polystyrene-equivalent weight average molecular weight of 150,000, manufactured by MITSUBISHI RAYON CO., LTD.) and the like. Examples of the water-dispersible conductive polymer include polythiophene conductive polymers (Denatron series manufactured by Nagase ChemteX Corporation) and the like.

The content of the antistatic agent may be 70 parts by weight or less, preferably 50 parts by weight or less, based on 100 parts by weight of the polymers for use for the anchor agent. In view of the antistatic effect, the content is preferably 10 parts by weight or more, more preferably 20 parts by weight or more.

The thickness of the anchor layer is preferably, but not limited to, 5 to 300 nm.

The anchor layer may be formed by any conventionally known method. When the anchor layer is formed, the iodine-based polarizing film may be subjected to an activation treatment. The activation treatment may be performed using various methods such as a corona treatment, a low-pressure UV treatment, and a plasma treatment.

The method described above may be used to form the pressure-sensitive adhesive layer on the anchor layer on the iodine-based polarizing film.

When the pressure-sensitive adhesive layer of the pressure-sensitive adhesive layer-attached substrate film of the invention is exposed, the pressure-sensitive adhesive layer may be protected by a release film (separator) until it is actually used. The release film may be as described above. The release film may be used as a substrate in the formation of the pressure-sensitive adhesive layer. In this case, the pressure-sensitive adhesive layer on the release film may be bonded to the substrate film such as the iodine-based polarizing film, so that the release film can be used to protect the pressure-sensitive adhesive layer of the pressure-sensitive adhesive layer-attached substrate film, which can simplify the process.

4. Laminate

The laminate of the invention includes the pressure-sensitive adhesive layer-attached substrate film and a transparent conductive layer-bearing substrate bonded to the pressure-sensitive adhesive layer-attached substrate film in such a manner that the pressure-sensitive adhesive layer of the pressure-sensitive adhesive layer-attached substrate film is in contact with the transparent conductive layer of the substrate.

The pressure-sensitive adhesive layer-attached substrate film used may be as described above.

The transparent conductive layer-bearing substrate may be of any known type, such as a member including a transparent substrate such as a transparent film and a transparent conductive coating provided on the transparent substrate or a member including a transparent conductive coating and a liquid crystal cell.

The transparent substrate may be of any type having transparency, such as a resin film or a substrate made of glass or the like (e.g., a substrate in the form of a sheet, a film, or a plate). A resin film is particularly preferred. The thickness of the transparent substrate is preferably, but not limited to, about 10 to about 200 µm, more preferably about 15 to about 150 µm.

The resin film may be made of any material, such as any of various plastic materials having transparency. Examples of such materials include polyester resins such as polyethylene terephthalate and polyethylene naphthalate, acetate resins, polyethersulfone resins, polycarbonate resins, polyamide resins, polyimide resins, polyolefin resins, (meth) acrylic resins, polyvinyl chloride resins, polyvinylidene chloride resins, polystyrene resins, polyvinyl alcohol resins, polyarylate resins, and polyphenylene sulfide resins. Among them, polyester resins, polyimide resins, and polyethersulfone resins are particularly preferred.

The surface of the transparent substrate may be previously subject to sputtering, corona discharge treatment, flame treatment, ultraviolet irradiation, electron beam irradiation, chemical treatment, etching treatment such as oxidation, or undercoating treatment such that the adhesion of the transparent conductive layer formed thereon to the substrate can be improved. If necessary, the substrate may also be subjected to dust removing or cleaning by solvent cleaning, ultrasonic cleaning or the like, before the transparent conductive layer is formed.

The constituent material of the transparent conductive layer is not particularly limited, and a metal oxide of at least one metal selected from the group consisting of indium, tin, zinc, gallium, antimony, titanium, silicon, zirconium, magnesium, aluminum, gold, silver, copper, palladium and tungsten is used. The metal oxide may further contain metal atoms shown in the above-mentioned group as necessary. For example, indium oxide (ITO) containing tin oxide, tin oxide containing antimony, and the like are preferably used, ITO is more preferably used. ITO preferably contains 80 to 99% by weight of indium oxide and 1 to 20% by weight of tin oxide.

The ITO may be crystalline or amorphous. The crystalline ITO can be obtained by high-temperature sputtering or further heating amorphous ITO. The iodine-induced degradation can significantly occur on amorphous ITO. Therefore, the pressure-sensitive adhesive layer-attached substrate film of the invention is particularly effective for use on amorphous ITO.

The thickness of the transparent conductive coating is preferably, but not limited to, 7 nm or more, more preferably 10 nm or more, even more preferably 12 to 60 nm, further more preferably 15 to 45 nm, still more preferably 18 to 45 nm, yet more preferably 20 to 30 nm. The transparent conductive coating with a thickness of less than 7 nm may be easily degraded by iodine and tend to be more variable in electric resistance. On the other hand, the transparent conductive coating with a thickness of more than 60 nm may be produced with lower productivity at higher cost and tend to have a lower level of optical properties.

The transparent conductive layer may be formed using known conventional methods, while the methods are not particularly limited. Examples of such methods include vacuum deposition, sputtering, and ion plating. Any appropriate method may be used depending on the required film thickness.

The thickness of the substrate having the transparent conductive layer may be from 15 to 200 µm. For a reduction in thickness, the thickness of the substrate having the transparent conductive layer is preferably from 15 to 150 µm, more preferably from 15 to 50 µm. When used in a resistive type, the substrate having the transparent conductive layer may have a thickness of, for example, 100 to 200 µm. When used in a capacitance type, the substrate having the transparent conductive layer preferably has a thickness of, for example, 15 to 100 µm and more preferably has a thickness of 15 to 50 µm, even more preferably 20 to 50 µm, in particular, to meet a demand for a further reduction in thickness in recent years.

If necessary, an undercoat layer, an oligomer blocking layer, or any additional layer may be provided between the transparent conductive layer and the transparent substrate.

The member having a transparent conductive coating and a liquid crystal cell may be a product for use in image display devices such as various liquid crystal display devices. Such a product includes a liquid crystal cell having a structure of substrate (e.g., glass substrate)/liquid crystal layer/substrate and a transparent conductive coating provided on a side of the substrate opposite to its side in contact with the liquid crystal layer. When a color filter substrate is provided on the liquid crystal cell, the transparent conductive coating may be provided on the color filter. The transparent conductive coating may be formed by the above method on the substrate of the liquid crystal cell.

5. Image Display Device

The laminate of the invention is suitable for use as a substrate (member) for forming devices such as input unit (touch panel or the like)-equipped image display devices (such as liquid crystal display devices, organic EL (electroluminescence) display devices, PDPs (plasma display panels), and electronic paper) and input devices (such as touch panels) or suitable for use in the manufacture of a substrate (member) for use in these devices. In particular, the laminate of the invention is suitable for use in the manufacture of an optical substrate for touch panels. In addition, the laminate of the invention can be used regardless of the type of touch panel or the like, such as resistive type or capacitance type.

The laminate of the invention may be subjected to processes such as cutting, resist printing, etching, and silver ink printing. After the processes, the resulting transparent conductive film may be used as a substrate (optical member) for optical devices. There is no particular limitation on the substrate for an optical device, as long as it is a substrate having optical characteristics, and examples thereof include a substrate (member) constituting devices such as image display devices (liquid crystal display devices, organic EL (electroluminescence) display devices, PDPs (plasma display panels), electronic paper, etc.) and input devices (touch panels, etc.) and a substrate (member) to be used in these devices.

The transparent conductive coating may be placed on the pressure-sensitive adhesive layer of the pressure-sensitive adhesive layer-attached substrate film of the invention. Also in this case, the pressure-sensitive adhesive layer-attached substrate film of the invention can prevent the transparent conductive layer from corroding and from increasing in surface resistance as described above. Therefore, the pressure-sensitive adhesive layer-attached substrate film of the invention is preferably used to form an image display device having a structure in which a transparent conductive layer is in contact with the pressure-sensitive adhesive layer of the pressure-sensitive adhesive layer-attached substrate film. For example, an image display device can be formed by bonding the pressure-sensitive adhesive layer-attached substrate film to a transparent conductive layer-bearing liquid crystal panel in such a manner that the pressure-sensitive adhesive layer of the pressure-sensitive adhesive layer-attached substrate film is in contact with the transparent conductive layer of the liquid crystal panel.

More specifically, examples include an image display device in which a transparent conductive coating is used as an antistatic layer; and an image display device in which a transparent conductive coating is used as a touch panel electrode. Specifically, the image display device in which a transparent conductive coating is used as an antistatic layer may have, for example, a structure including, as shown in FIG. 1, a polarizing film 1, a pressure-sensitive adhesive layer 2, an antistatic layer 3, a glass substrate 4, a liquid crystal layer 5, a driving electrode 6, a glass substrate 4, a pressure-sensitive adhesive layer 2, and a polarizing film 1, stacked in this order, in which the antistatic layer 3 and the driving electrode 6 are each formed of a transparent conductive layer. The pressure-sensitive adhesive layer-attached substrate film of the invention may be used to form an upper side (viewer side) part (the film 1 and the pressure-sensitive adhesive layer 2) of the image display device. The image display device in which a transparent conductive coating is used as a touch panel electrode may have, for example, a structure (an in-cell touch panel) including a polarizing film 1, a pressure-sensitive adhesive layer 2, a sensor layer 7 also serving as an antistatic layer, a glass substrate 4, a liquid crystal layer 5, a sensor layer 8 also serving as a driving electrode, a glass substrate 4, a pressure-sensitive adhesive layer 2, and a polarizing film 1, stacked in this order, or a structure (an on-cell touch panel) including a polarizing film 1, a pressure-sensitive adhesive layer 2, a sensor layer 7 also serving as an antistatic layer, a sensor layer 9, a glass substrate 4, a liquid crystal layer 5, a driving electrode 6, a glass substrate 4, a pressure-sensitive adhesive layer 2, and a polarizing film 1, stacked in this order, in which the sensor layer 7 also serving as an antistatic layer, the sensor layer 9, and the driving electrode 6 are each formed of a transparent conductive layer. The pressure-sensitive adhesive layer-attached substrate film of the invention may be used to form an upper side (viewer side) part (the film 1 and the pressure-sensitive adhesive layer 2) of the image display device.

EXAMPLES

Hereinafter, the invention will be more specifically described with reference to examples, which, however, are not intended to limit the gist of the invention. In each example, "parts" and "%" are all by weight.

<Iodine Content of Polarizer>

The iodine content of a polarizer (the content of iodine and/or iodide ions in a polarizer) was measured by the following procedure.

(1) A plurality of polarizers containing predetermined amounts of potassium iodide were measured for fluorescent X-ray intensity, and a relation between the iodine content and the fluorescent X-ray intensity was introduced from the measurements.

(2) An iodine-based polarizer with an unknown iodine content was measured for fluorescent X-ray intensity, and its iodine content was calculated from the measured value using the relation.

Production Example 1 (Production of Substrate Film (1))

A laminate including an amorphous PET substrate and a 9-μm-thick polyvinyl alcohol (PVA) layer formed thereon was subjected to auxiliary in-air stretching at a stretching temperature of 130° C. to form a stretched laminate. Subsequently, the stretched laminate was immersed for 60 seconds in a dyeing solution including 100 parts by weight of water, 0.1 parts by weight of iodine, and 0.7 parts by weight of potassium iodide to form a dyed laminate. The dyed laminate was further subjected to stretching in an aqueous boric acid solution at a stretching temperature of 65° C. to a total stretch ratio of 5.94 times, so that an optical film laminate was obtained which had a 4-μm-thick PVA layer stretched together with the amorphous PET substrate. As a result of such two-stage stretching, an optical film laminate having a 4-μm-thick PVA layer formed on the amorphous PET substrate was successfully obtained. In the PVA layer, PVA molecules were highly oriented. The PVA layer formed a highly-functional polarizing layer in which iodine adsorbed by the dyeing formed a polyiodide ion complex oriented highly in a single direction. A 40-μm-thick, saponified acrylic resin film (transparent protective film (1)) was bonded to the surface of the polarizing layer of the optical film laminate while a PVA-based adhesive was applied to the surface. Subsequently, the amorphous PET substrate was peeled off, so that a polarizing film including the thin iodine-based polarizer and the transparent protective film on only one side of the polarizer was obtained. Hereinafter, this product will be referred to as substrate film (1). The iodine content of substrate film (1) was 5.1% by weight.

Production Example 2 (Production of Substrate Film (2))

An 80-μm-thick polyvinyl alcohol film was stretched to 3 times between rolls different in velocity ratio while it was dyed in a 0.3% iodine solution at 30° C. for 1 minute. The film was then stretched to a total stretch ratio of 6 times while it was immersed in an aqueous solution containing 4% of boric acid and 10% of potassium iodide at 60° C. for 0.5 minutes. Subsequently, the film was washed by immersion in an aqueous solution containing 1.5% of potassium iodide at 30° C. for 10 seconds and then dried at 50° C. for 4 minutes to give a 25-μm-thick polarizer with an iodine content of 2.3% by weight.

A 40-μm-thick, saponified acrylic resin film (transparent protective film (1)) was then bonded to one surface of the polarizer while a PVA-based adhesive was applied to the surface, and then, a 25-μm-thick norbornene-based film (transparent protective film (2)) was bonded to the other surface of the polarizer with a PVA-based adhesive, so that a double-side-protected polarizing film was obtained. Hereinafter, this product will be referred to as substrate film (2). The iodine content of substrate film (2) was 2.3% by weight.

The polarizer, the thickness of the transparent protective film, the total thickness of the polarizing film, and the iodine content (the content of iodine and/or iodide ions in the polarizer), which are used in each of substrate films (1) and (2) obtained in Production Examples 1 and 2, are summarized in Table 1 below.

Production Example 5 (Production of Acryl-Based Polymer (A-3)-Containing Solution)

A reaction vessel equipped with a condenser tube, a nitrogen inlet tube, a thermometer, and a stirrer was charged with 88.4 parts of butyl acrylate, 0.1 parts of 4-hydroxybutyl acrylate, 0.5 parts of acrylic acid, 11 parts of benzyl acrylate, and 1 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer (A-3) with a weight average molecular weight of 1,800,000 (solid concentration 30% by weight).

Production Example 6 (Production of Acryl-Based Polymer (A-4)-Containing Solution)

A reaction vessel equipped with a condenser tube, a nitrogen inlet tube, a thermometer, and a stirrer was charged with 83.9 parts of butyl acrylate, 0.1 parts of 2-hydroxyethyl acrylate, 5 parts of acrylic acid, 11 parts of benzyl acrylate, and 1 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer (A-4) with a weight average molecular weight of 2,000,000 (solid concentration 30% by weight).

TABLE 1

|  |  | Polarizer thickness (μm) | Transparent protective film (1) thickness (μm) | Transparent protective film (2) thickness (μm) | Total thickness (μm) of polarizing film | Iodine content (wt %) |
|---|---|---|---|---|---|---|
| Production Example 1 | Substrate film (1) | 4 | 40 | — | 44 | 5.1 |
| Production Example 2 | Substrate film (2) | 25 | 40 | 25 | 90 | 2.3 |

In addition, a 38-μm-thick polyethylene terephthalate (PET) film (manufactured by Mitsubishi Plastics, Inc.) was used as substrate film (3), and a 100-μm-thick polyethylene terephthalate (PET) film (manufactured by Mitsubishi Plastics, Inc.) was used as substrate film (4).

Production Example 3 (Production of Acryl-Based Polymer (A-1)-Containing Solution)

A reaction vessel equipped with a condenser tube, a nitrogen inlet tube, a thermometer, and a stirrer was charged with 83.9 parts of butyl acrylate, 0.1 parts of 4-hydroxybutyl acrylate, 5 parts of acrylic acid, 11 parts of benzyl acrylate, and 1 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer (A-1) with a weight average molecular weight of 2,000,000 (solid concentration 30% by weight).

Production Example 4 (Production of Acryl-Based Polymer (A-2)-Containing Solution)

A reaction vessel equipped with a condenser tube, a nitrogen inlet tube, a thermometer, and a stirrer was charged with 94.9 parts of butyl acrylate, 0.1 parts of 4-hydroxybutyl acrylate, 5 parts of acrylic acid, and 1 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer (A-2) with a weight average molecular weight of 2,000,000 (solid concentration 30% by weight).

Production Example 7 (Production of Acryl-Based Polymer (A-5)-Containing Solution)

A reaction vessel equipped with a condenser tube, a nitrogen inlet tube, a thermometer, and a stirrer was charged with 83.9 parts of butyl acrylate, 0.1 parts of 4-hydroxybutyl acrylate, 5 parts of acrylic acid, 11 parts of benzyl acrylate, and 2 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer (A-5) with a weight average molecular weight of 900,000 (solid concentration 30% by weight).

Production Example 8 (Production of Acryl-Based Polymer (A-6)-Containing Solution)

A reaction vessel equipped with a condenser tube, a nitrogen inlet tube, a thermometer, and a stirrer was charged with 99 parts of butyl acrylate, 1 parts of 4-hydroxybutyl acrylate, and 1 part of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer (A-6) with a weight average molecular weight of 1,600,000 (solid concentration 30% by weight).

The weight average molecular weight of acryl-based polymers obtained in the production examples 3 to 8 was measured the following method.

<Measurement of Weight Average Molecular Weight (Mw) of Acryl-Based Polymer>

A weight average molecular weight of the produced polymer was measured by gel permeation chromatography (GPC).

Apparatus: HLC-8220GPC manufactured by TOSOH CORPORATION
Column:
Sample column; TSKguardcolumn Super HZ-H (one column) and TSKgel Super HZM-H (two columns), manufactured by TOSOH CORPORATION
Reference column; TSKgel Super H-RC (one column), manufactured by TOSOH CORPORATION
Flow rate: 0.6 ml/minute
Injection amount: 10 μl
Column temperature: 40° C.
Eluent: THF
Concentration of injected sample: 0.2% by weight
Detector: differential refractometer The weight average molecular weight was calculated in terms of polystyrene.

Example 1

(Preparation of Acrylic Pressure-Sensitive Adhesive Composition)

Based on 100 parts of the solid in the acrylate copolymer (A-1)-containing solution (solid concentration 30% by weight) obtained in Production Example 3, 0.5 parts of trimethylolpropane-tolylene diisocyanate adduct (CORONATE L (trade name) manufactured by Nippon Polyurethane Industry Co., Ltd.) as a crosslinking agent, 0.1 parts of dibenzoyl peroxide as a crosslinking agent, 0.4 parts of phenylphosphonic acid (manufactured by Wako Pure Chemical Industries, Ltd.) as a phosphonic acid compound, and 0.1 parts of γ-glycidoxypropyltrimethoxysilane (KBM-403 (trade name) manufactured by Shin-Etsu Chemical Co., Ltd.) as a silane coupling agent were added to the acrylate copolymer (A-1)-containing solution to form an acrylic pressure-sensitive adhesive composition.

(Preparation of Pressure-Sensitive Adhesive Layer-Attached Substrate Film)

The acrylic pressure-sensitive adhesive composition was uniformly applied to the surface of a silicone release agent-treated polyethylene terephthalate film (substrate) with a fountain coater and then dried in an air circulation-type thermostatic oven at 155° C. for 2 minutes, so that a 20-μm-thick pressure-sensitive adhesive layer was formed on the surface of the substrate. Subsequently, the pressure-sensitive adhesive layer-bearing separator was attached to a surface of polarizing film (1), where no protective film was provided, so that a pressure-sensitive adhesive layer-attached substrate film was obtained.

Examples 2 to 5

Pressure-sensitive adhesive layer-attached substrate films were prepared as in Example 1, except that the added amount of the phosphonic acid compound was changed from 0.4 parts to the number of parts shown in Table 2.

Example 6

A pressure-sensitive adhesive layer-attached substrate film was prepared as in Example 1, except that 0.4 parts of phenylphosphonic acid (manufactured by Wako Pure Chemical Industries, Ltd.) was replaced with 0.3 parts of ethanephosphonic acid (manufactured by Wako Pure Chemical Industries, Ltd.).

Example 7

A pressure-sensitive adhesive layer-attached substrate film was prepared as in Example 1, except that 0.4 parts of phenylphosphonic acid (manufactured by Wako Pure Chemical Industries, Ltd.) was replaced with 0.3 parts of phosphonic acid (manufactured by TOHO Chemical Industry Co., Ltd.).

Examples 8 to 12

Pressure-sensitive adhesive layer-attached substrate films were prepared as in Example 1, except that the acryl-based polymer (A-1)-containing solution obtained in Production Example 3 was replaced with each of the solutions containing acryl-based polymers (A-2) to (A-6) obtained in Production Examples 4 to 8.

Example 13

(Preparation of Acrylic Pressure-Sensitive Adhesive Composition)

Based on 100 parts of the solid in the acrylate copolymer (A-1)-containing solution (solid concentration 30% by weight) obtained in Production Example 3, 0.5 parts of trimethylolpropane-tolylene diisocyanate adduct (CORONATE L (trade name) manufactured by Nippon Polyurethane Industry Co., Ltd.) as a crosslinking agent, 0.1 parts of dibenzoyl peroxide as a crosslinking agent, 0.3 parts of phenylphosphonic acid (manufactured by Wako Pure Chemical Industries, Ltd.) as a phosphonic acid compound, 0.1 parts of γ-glycidoxypropyltrimethoxysilane (KBM-403 (trade name) manufactured by Shin-Etsu Chemical Co., Ltd.) as a silane coupling agent and 1 part of 1-methyl-1-ethylpyrrolidinium bis(trifluoromethanesulfonyl)imide (manufactured by KISHIDA CHEMICAL Co., Ltd.) as an ionic compound were added to the acrylate copolymer (A-1)-containing solution to form an acrylic pressure-sensitive adhesive composition.

(Preparation of Pressure-Sensitive Adhesive Layer-Attached Substrate Film)

A pressure-sensitive adhesive layer-attached substrate film was prepared as in Example 1, except that the resulting acrylic pressure-sensitive adhesive composition was used instead.

Example 14

A pressure-sensitive adhesive layer-attached substrate film was prepared as in Example 1, except that substrate film (2) was used instead of substrate film (1) in the preparation of the pressure-sensitive adhesive layer-attached substrate film. The pressure-sensitive adhesive layer was formed on the 25-μm-thick norbornene-based film (transparent productive film (2)) side of substrate film (2).

Examples 15 and 16

Pressure-sensitive adhesive layer-attached substrate films were prepared as in Example 1, except that substrate film (3)

or (4) was used instead of substrate film (1) in the preparation of the pressure-sensitive adhesive layer-attached substrate film.

Comparative Examples 1 and 2

Pressure-sensitive adhesive layer-attached substrate films were prepared as in Example 1, except that the added amount of the phosphonic acid compound was changed from 0.4 parts to the number of parts shown in Table 2.

Comparative Example 3

A pressure-sensitive adhesive layer-attached substrate film was prepared as in Example 9, except that the phosphonic acid compound was not used.

Comparative Example 4

A pressure-sensitive adhesive layer-attached substrate film was prepared as in Example 12, except that the phosphonic acid compound was not used.

Comparative Example 5

A pressure-sensitive adhesive layer-attached substrate film was prepared as in Example 14, except that the phosphonic acid compound was not used.

Comparative Example 6

A pressure-sensitive adhesive layer-attached substrate film was prepared as in Example 11, except that the phosphonic acid compound was not used in the preparation of the acrylic pressure-sensitive adhesive composition and that substrate film (2) was used instead of substrate film (1) in the preparation of the pressure-sensitive adhesive layer-attached substrate film.

Comparative Example 7

A pressure-sensitive adhesive layer-attached substrate film was prepared as in Example 15, except that the phosphonic acid compound was not used.

The pressure-sensitive adhesive layer-attached substrate films obtained in the examples and the comparative examples were evaluated as described below.

<Corrosion Resistance Test>

A 15 mm×15 mm piece was cut from a conductive film having an amorphous ITO layer formed at its surface (ELECRYSTA P400L (trade name) manufactured by Nitto Denko Corporation, hereinafter referred to as "transparent conductive substrate (E-1)"). An 8 mm×8 mm cut piece of each of the pressure-sensitive adhesive layer-attached substrate films obtained in the examples and the comparative examples was bonded to the center of the cut piece of the conductive film. The resulting laminate was then autoclaved at 50° C. and 5 atm for 15 minutes to give a sample for corrosion resistance measurement. The resulting measurement sample was measured for resistance value using the measuring device mentioned below. The measured value was used as the "initial resistance".

Subsequently, the measurement sample was stored for 500 hours in an environment at a temperature of 60° C. and a humidity of 90% and then measured for resistance value. The measured value was used as the "resistance after heating and humidification". The resistance values were measured using HL5500PC manufactured by Accent Optical Technologies, Inc. The rate (%) of resistance change was calculated from the "initial resistance" and the "resistance after heating and humidification" measured as described above and then evaluated based on the evaluation criteria below.

$$\text{Rate (\%) of resistance change} = \frac{\text{(the resistance after heating and humidification)}}{\text{(the initial resistance)}} \times 100$$

[Mathematical expression 1]

(Evaluation Criteria)
⊙: The rate of resistance change is less than 150% (the heating and humidification-induced increase in resistance is small (good corrosion resistance)).
○: The rate of resistance change is from 150% to less than 300%.
Δ: The rate of resistance change is from 300% to less than 400%.
x: The rate of resistance change is 400% or more (the heating and humidification-induced increase in resistance is large (poor corrosion resistance)).

In addition to using transparent conductive substrate (E-1) shown above, the pressure-sensitive adhesive layer-attached substrate film of Example 1 was also subjected to the corrosion resistance test using the following transparent conductive substrates.
Transparent conductive substrate (E-2): a crystalline ITO layer-bearing film (V150-G5Y (trade name) manufactured by Nitto Denko Corporation)
Transparent conductive substrate (E-3): an amorphous ITO layer-bearing glass sheet
Transparent conductive substrate (E-4): a crystalline ITO layer-bearing glass sheet
Transparent conductive substrates (E-3) and (E-4) were produced by the method described below.
(Production of Transparent Conductive Substrates (E-3) and (E-4))
An ITO coating was formed on one surface of a non-alkali glass sheet by sputtering to form each of a crystalline ITO thin coating-bearing transparent conductive substrate (E-4) and an amorphous ITO coating-bearing transparent conductive substrate (E-3). Each substrate was heat-treated at 140° C. for 30 minutes before bonded to the pressure-sensitive adhesive layer-attached substrate film obtained in each of the examples and the comparative examples. The crystalline ITO thin coating had a Sn content of 10% by weight. The amorphous ITO thin coating had a Sn content of 3% by weight. The Sn content of the ITO thin coatings was calculated from (the weight of Sn atoms)/(the weight of Sn atoms+the weight of In atoms).

<Durability Test on Pressure-Sensitive Adhesive (Peeling and Foaming)>

The separator was peeled off from the pressure-sensitive adhesive layer-attached substrate film obtained in each of the examples and the comparative examples. The substrate film was then bonded to a non-alkali glass sheet (EG-XG manufactured by Corning Incorporated) and the ITO surface of the amorphous ITO-bearing glass sheet (transparent conductive substrate (E-3)), respectively. The resulting laminate was autoclaved at 50° C. and 5 atm for 15 minutes and then placed in a heating oven at 80° C. and a thermo-hygrostat at 60° C. and 90% RH, respectively. After 500 hours, the substrate film was visually observed for peeling and foaming and evaluated based on the evaluation criteria below.
⊙: Neither peeling nor foaming was observed.
○: Peeling or foaming occurred, but it was difficult to observe visually.
Δ: Small peeling or foaming was visually observed.
x: Significant peeling or foaming was observed.

TABLE 2

| | Acrylic pressure-sensitive adhesive composition | | | | | | | | | | | Corrosion resistance | | | Durability (peeling and foaming) | | | |
|---|---|---|---|---|---|---|---|---|---|---|---|---|---|---|---|---|---|---|
| | | Iodine content | (Meth)acryl-based polymer | | Phosphonic acid compound | | Crosslinking agent | | | | Silane coupling agent | Ionic compound | Transparent conductive substrate | Rate (%) of change resistance | Evaluation | Non-alkali glass | | Amorphous ITO glass | |
| | Substrate film | (wt %) | Type | Parts | Type | Parts | Peroxide Type | Parts | Isocyanate compound Type | Parts | Type (Parts) | Parts | | | | Heating 80° C. | Humidification 60° C./90% RH | Heating 80° C. | Humidification 60° C./90% RH |
| Example 1 | Substrate film (1) | 5.1 | A-1 | 100 | B-1 | 0.4 | | 0.1 | | 0.5 | 0.1 | 0 | E-1 | 123 | ⊙ | ⊙ | ⊙ | ⊙ | ⊙ |
| | | | | | | | | | | | | | E-2 | 113 | ⊙ | ⊙ | ⊙ | ⊙ | ⊙ |
| | | | | | | | | | | | | | E-3 | 125 | ⊙ | ⊙ | ⊙ | ⊙ | ⊙ |
| | | | | | | | | | | | | | E-4 | 112 | ⊙ | ⊙ | ⊙ | ⊙ | ⊙ |
| Example 2 | Substrate film (1) | 5.1 | A-1 | 100 | B-1 | 0.1 | | 0.1 | | 0.5 | 0.1 | 0 | E-1 | 144 | ⊙ | ⊙ | ⊙ | ⊙ | ⊙ |
| Example 3 | Substrate film (1) | 5.1 | A-1 | 100 | B-1 | 0.8 | | 0.1 | | 0.5 | 0.1 | 0 | E-1 | 123 | ⊙ | ⊙ | ⊙ | ○ | ⊙ |
| Example 4 | Substrate film (1) | 5.1 | A-1 | 100 | B-1 | 0.05 | | 0.1 | | 0.5 | 0.1 | 0 | E-1 | 256 | ○ | ⊙ | ⊙ | ○ | ⊙ |
| Example 5 | Substrate film (1) | 5.1 | A-1 | 100 | B-1 | 2 | | 0.1 | | 0.5 | 0.1 | 0 | E-1 | 110 | ⊙ | ⊙ | ⊙ | ○ | ○ |
| Example 6 | Substrate film (1) | 5.1 | A-1 | 100 | B-2 | 0.3 | | 0.1 | | 0.5 | 0.1 | 0 | E-1 | 124 | ⊙ | ⊙ | ⊙ | ⊙ | ⊙ |
| Example 7 | Substrate film (1) | 5.1 | A-1 | 100 | B-3 | 0.3 | | 0.1 | | 0.5 | 0.1 | 0 | E-1 | 151 | ○ | ⊙ | ⊙ | ○ | ⊙ |
| Example 8 | Substrate film (1) | 5.1 | A-2 | 100 | B-1 | 0.3 | | 0.1 | | 0.5 | 0.1 | 0 | E-1 | 121 | ⊙ | ⊙ | ⊙ | ○ | ⊙ |
| Example 9 | Substrate film (1) | 5.1 | A-3 | 100 | B-1 | 0.3 | | 0.1 | | 0.5 | 0.1 | 0 | E-1 | 123 | ⊙ | ⊙ | ⊙ | ⊙ | ⊙ |
| Example 10 | Substrate film (1) | 5.1 | A-4 | 100 | B-1 | 0.3 | | 0.1 | | 0.5 | 0.1 | 0 | E-1 | 116 | ⊙ | ⊙ | ○ | ⊙ | ⊙ |
| Example 11 | Substrate film (1) | 5.1 | A-5 | 100 | B-1 | 0.3 | | 0.1 | | 0.5 | 0.1 | 0 | E-1 | 118 | ⊙ | ○ | ○ | ○ | ○ |
| Example 12 | Substrate film (1) | 5.1 | A-6 | 100 | B-1 | 0.3 | | 0.1 | | 0.5 | 0.1 | 1 | E-1 | 111 | ⊙ | ⊙ | ⊙ | ⊙ | ⊙ |
| Example 13 | Substrate film (1) | 5.1 | A-1 | 100 | B-1 | 0.3 | | 0.1 | | 0.5 | 0.1 | 0 | E-1 | 120 | ⊙ | ⊙ | ⊙ | ⊙ | ⊙ |
| Example 14 | Substrate film (2) | 2.3 | A-1 | 100 | B-1 | 0.3 | | 0.1 | | 0.5 | 0.1 | 0 | E-1 | 114 | ⊙ | ⊙ | ⊙ | ⊙ | ⊙ |
| Example 15 | Substrate film (3) | 0 | A-1 | 100 | B-1 | 0.3 | | 0.1 | | 0.5 | 0.1 | 0 | E-1 | 113 | ⊙ | ⊙ | ⊙ | ⊙ | ⊙ |
| Example 16 | Substrate film (4) | 0 | A-1 | 100 | B-1 | 0.3 | | 0.1 | | 0.5 | 0.1 | 0 | E-1 | 112 | ⊙ | ⊙ | ⊙ | ⊙ | ⊙ |
| Comparative Example 1 | Substrate film (1) | 5.1 | A-1 | 100 | B-1 | 0.003 | | 0.1 | | 0.5 | 0.1 | 0 | E-1 | 665 | × | ⊙ | ⊙ | ⊙ | ⊙ |
| Comparative Example 2 | Substrate film (1) | 5.1 | A-1 | 100 | B-1 | 4 | | 0.1 | | 0.5 | 0.1 | 0 | E-1 | 111 | ⊙ | ○ | △ | × | × |
| Comparative Example 3 | Substrate film (1) | 5.1 | A-3 | 100 | — | 0 | | 0.1 | | 0.5 | 0.1 | 0 | E-1 | 366 | △ | ⊙ | ⊙ | ○ | ⊙ |

TABLE 2-continued

| | | | | | | | | | | | | |
|---|---|---|---|---|---|---|---|---|---|---|---|---|
| Comparative Example 4 | Substrate film (1) | 5.1 | A-6 | 100 | — | 0 | 0.1 | 0.5 | 0.1 | 0 | E-1 | 343 | △ | ⊙ | ⊙ | ⊙ |
| Comparative Example 5 | Substrate film (2) | 2.3 | A-1 | 100 | — | 0 | 0.1 | 0.5 | 0.1 | 0 | E-1 | 553 | × | ⊙ | ⊙ | ⊙ |
| Comparative Example 6 | Substrate film (2) | 2.3 | A-5 | 100 | — | 0 | 0.1 | 0.5 | 0.1 | 0 | E-1 | 565 | × | ○ | ○ | ○ |
| Comparative Example 7 | Substrate film (3) | 0 | A-1 | 100 | — | 0 | 0.1 | 0.5 | 0.1 | 0 | E-1 | 465 | × | ⊙ | ⊙ | ⊙ |

The respective abbreviations in Table 2 are as follows.
(Phosphonic Acid Compound)
B-1: Phenylphosphonic acid (manufactured by Wako Pure Chemical Industries, Ltd.)
B-2: Ethanephosphonic acid (manufactured by Wako Pure Chemical Industries, Ltd.)
B-3: Phosphonic acid (manufactured by KISHIDA CHEMICAL Co., Ltd.)
(Crosslinking Agent)
Peroxide: Dibenzoyl peroxide
Isocyanate compound: Trimethylolpropane-tolylene diisocyanate adduct (CORONATE L (trade name) manufactured by Nippon Polyurethane Industry Co., Ltd.)
(Ionic Compound)
1-methyl-1-ethylpyrrolidinium bis(trifluoromethanesulfonyl)imide (manufactured by KISHIDA CHEMICAL Co., Ltd.)

In Tables 1 and 2, the iodine content refers to the content (% by weight) of iodine and/or iodide ions in the polarizer.

DESCRIPTION OF REFERENCE SIGNS 1 polarizing film
2 pressure-sensitive adhesive layer
3 antistatic layer
4 glass substrate
5 liquid crystal layer
6 driving electrode
7 sensor layer also serving as an antistatic layer
8 sensor layer also serving as a driving electrode
9 sensor layer

The invention claimed is:

1. An acrylic pressure-sensitive adhesive composition, comprising:
a (meth)acryl-based polymer,
wherein the (meth)acryl-based polymer comprises monomer units derived from alkyl (meth)acrylate, and a content of the monomer units derived from alkyl (meth)acrylate is 50 parts by weight or more based on 100 parts by total weight of monomer units forming the (meth)acryl-based polymer; and
a phosphonic acid compound represented by formula (1), or a salt thereof:

[Formula 1]

wherein R is one of (i) a hydrogen atom or (ii) a hydrocarbon residue having 1 to 18 carbon atoms and optionally containing an oxygen atom, with the proviso that if the hydrocarbon residue contains an oxygen atom, the oxygen atom is not bonded directly to the phosphorus in formula (1),
wherein the acrylic pressure-sensitive adhesive composition comprises 0.005 to 3 parts by weight of the phosphonic acid compound represented by formula (1) or a salt thereof, based on 100 parts by weight of the (meth)acryl-based polymer.

2. The acrylic pressure-sensitive adhesive composition according to claim 1, wherein the (meth)acryl-based polymer has a weight average molecular weight of 1,200,000 to 3,000,000.

3. The acrylic pressure-sensitive adhesive composition according to claim 1, wherein the (meth)acryl-based polymer further comprises a carboxyl group-containing monomer unit.

4. The acrylic pressure-sensitive adhesive composition according to claim 1, further comprising an isocyanate crosslinking agent.

5. The acrylic pressure-sensitive adhesive composition according to claim 1, wherein R is a hydrocarbon residue comprising an aryl group of 6 to 18 carbon atoms.

6. The acrylic pressure-sensitive adhesive composition according claim 1, which is for forming a pressure-sensitive adhesive layer to be in contact with a conductive layer of a conductive layer-bearing conductive substrate.

7. The acrylic pressure-sensitive adhesive composition according to claim 6, wherein the conductive layer is a transparent conductive layer.

8. The acrylic pressure-sensitive adhesive composition according to claim 7, wherein the transparent conductive layer is made of indium tin oxide.

9. The acrylic pressure-sensitive adhesive composition according to claim 8, wherein the indium tin oxide is amorphous indium tin oxide.

10. An acrylic pressure-sensitive adhesive layer made from the acrylic pressure-sensitive adhesive composition according to claim 1.

11. A pressure-sensitive adhesive layer-attached substrate film, comprising:
a substrate film; and
the acrylic pressure-sensitive adhesive layer according to claim 10 provided on at least one surface of the substrate film.

12. The pressure-sensitive adhesive layer-attached substrate film according to claim 11, wherein the substrate film is an iodine-based polarizing film comprising: an iodine-based polarizer containing 1 to 14% by weight of iodine and/or iodide ions; and a transparent protective film provided on at least one surface of the iodine-based polarizer.

13. The pressure-sensitive adhesive layer-attached substrate film according to claim 12, wherein the iodine-based polarizer contains 3 to 12% by weight of iodine and/or iodide ions.

14. The pressure-sensitive adhesive layer-attached substrate film according to claim 12, wherein the iodine-based polarizing film is a one-side-protected polarizing film having the transparent protective film on only one side of the iodine-based polarizer, and the pressure-sensitive adhesive layer is in contact with a surface of the one-side-protected polarizing film where no transparent protective film is provided.

15. A laminate, comprising:
the pressure-sensitive adhesive layer-attached substrate film according to claim 11; and
a transparent conductive layer-bearing substrate bonded to the pressure-sensitive adhesive layer-attached substrate film in such a manner that the pressure-sensitive adhesive layer of the pressure-sensitive adhesive layer-attached substrate film is in contact with the transparent conductive layer of the substrate.

16. An image display device, comprising:
the pressure-sensitive adhesive layer-attached substrate film according to claim 11; and
a liquid crystal panel having a transparent conductive layer, wherein
the pressure-sensitive adhesive layer-attached substrate film and the liquid crystal panel are bonded together in such a manner that the pressure-sensitive adhesive layer of the pressure-sensitive adhesive layer-attached substrate film is in contact with the transparent conductive layer of the liquid crystal panel.

17. An image display device comprising the laminate according to claim 15 as a touch panel.

* * * * *